US 9,059,935 B2
Jun. 16, 2015

(12) United States Patent
Hudzia et al.

(54) DYNAMIC ADAPTATIONS FOR NETWORK DELAYS DURING COMPLEX EVENT PROCESSING

(75) Inventors: Benoit Hudzia, Belfast (GB); Stephen Dawson, Belfast (GB); Alan Hay, Belfast (GB)

(73) Assignee: SAP SE, Walldorf (DE)

(*) Notice: Subject to any disclaimer, the term of this patent is extended or adjusted under 35 U.S.C. 154(b) by 761 days.

(21) Appl. No.: 13/302,799

(22) Filed: Nov. 22, 2011

(65) Prior Publication Data

US 2013/0132560 A1 May 23, 2013

(51) Int. Cl.
*G06F 15/173* (2006.01)
*H04L 12/841* (2013.01)
*H04L 12/24* (2006.01)

(52) U.S. Cl.
CPC ............ *H04L 47/283* (2013.01); *H04L 41/064* (2013.01)

(58) Field of Classification Search
CPC ............................ H04L 47/283; H04L 41/064
USPC .......................................................... 709/224
See application file for complete search history.

(56) References Cited

U.S. PATENT DOCUMENTS

| | | | | |
|---|---|---|---|---|
| 7,051,244 B2* | 5/2006 | Fisher et al. | ..................... | 714/48 |
| 7,787,456 B2* | 8/2010 | Le et al. | ..................... | 370/389 |
| 8,381,038 B2* | 2/2013 | Hasegawa et al. | ............... | 714/39 |
| 8,683,490 B2* | 3/2014 | Endrikhovski et al. | ....... | 719/318 |
| 8,762,951 B1* | 6/2014 | Kosche et al. | ............... | 717/127 |
| 2004/0230854 A1 | 11/2004 | Elko et al. | | |
| 2005/0262233 A1* | 11/2005 | Alon et al. | ..................... | 709/223 |
| 2007/0156545 A1* | 7/2007 | Lin | ................. | 705/28 |
| 2007/0266142 A1* | 11/2007 | Nastacio | ........................ | 709/224 |
| 2008/0127116 A1* | 5/2008 | Kosche et al. | ................. | 717/130 |
| 2010/0332652 A1* | 12/2010 | Bhattacharya et al. | ........ | 709/224 |
| 2012/0137367 A1* | 5/2012 | Dupont et al. | ................... | 726/25 |

OTHER PUBLICATIONS

Cai, Wentong, et al., "An Auto-Adaptive Dead Reckoning Algorithm for Distributed Interactive Simulation", In Proceedings of the Thirteenth Workshop on Parallel and Distributed Simulation, PADS '99, 1999, pp. 82-89.

Delaney, D. et al., "On Consistency and Network Latency in Distributed Interactive Applications: A Survey-Part II", Virtual Environment, vol. 15, No. 4, Aug. 2006, pp. 465-482.

Mui, Emily, et al., "Event Insight: SAP's First Complex Event Processing Engine for the Business User", SAP Business Objects, PMC106, Oct. 12, 2010, 15 pages.

(Continued)

*Primary Examiner* — Guang Li
(74) *Attorney, Agent, or Firm* — Brake Hughes Bellermann LLP

(57) ABSTRACT

A message handler may receive a plurality of messages associated with a plurality of events, the events having a temporal relationship to one another. A header inspector may extract latency information from the plurality of messages, the latency information characterizing a transmission duration experienced by each message in traveling from the one or more source nodes through the network. A window manager may correct a disruption in the temporal relationship between at least two events of the plurality of events, the disruption including relative differences in the transmission duration experienced by the at least two events, including relating the at least two events to a time window for processing the at least two events. An event processor may process the at least two events relative to the time window.

18 Claims, 18 Drawing Sheets

(56) References Cited

OTHER PUBLICATIONS

Feng, Jie, et al., "Packet reordering in high-speed networks and its impact on high-speed TCP variants", Elsevier, Computer Communications, vol. 32, Sep. 22, 2008, pp. 1-7.

Kenny, Alan, et al., "Controlling entity state updates to maintain remote consistency within a distributed interactive application", ACM Transactions on Internet Technology, vol. 9, Issue 4, Article 15, Sep. 2009, pp. 15:1-15:25.

Luo, Xiapu, et al., "Novel approaches to end-to-end packet reordering measurement", In Proceedings of the 5th ACM SIGCOMM conference on Internet Measurement, IMC '05, 2005, 12 pages.

Piratla, Nischal M., et al., "Reorder Buffer-Occupancy Density and its Application for Measurement and Evaluation of Packet Reordering", Computer Communications, vol. 30, Jun. 2007, pp. 1-34.

Roberts, Dave, et al., "Bounding Inconsistency Using a Novel Threshold Metric for Dead Reckoning Update Packet Generation", Simulation, vol. 84, No. 5, May 2008, pp. 239-256.

Extended European Search Report for EP Application No. 12007878.7, mailed Jun. 4, 2013, 7 pages.

\* cited by examiner

DYNAMIC ADAPTATIONS FOR NETWORK DELAYS DURING COMPLEX EVENT PROCESSING

TECHNICAL FIELD

This description relates to complex event processing.

BACKGROUND

In complex events processing, events generally include virtually any occurrence which may directly or indirectly provide a user with desired information. For example, such events may include physical, real world events which are detected by one or more sensors. In the context of computers/networks, events may include virtually any operation which may be performed by or between one or more computers. In the business realm, events may include virtually any financial transaction or activity related thereto.

In these and many other contexts, the term event, by itself, generally prefers to a low-level event (and/or a message encapsulating relevant information about such an event(s)), which is often brief, discrete, unsinkhronized, and/or difficult or impossible to predict. In many cases, such events may occur relatively quickly and may be relatively voluminous within a given time period.

Using current technology, it is often technically straightforward to capture such individual events. Moreover, in many cases, the required hardware/software used to deploy sensors and other event detection components may be relatively inexpensive. As a result, it is possible to capture very large numbers of events within relatively short timeframes. However, such low-level events, by themselves, by definition, often do not individually provide sufficient and/or meaningful information required by a user. Further, even when such low-level events do provide desired information, the relatively large quantity of events may be difficult to represent, store, or transmit in electronic form. For example, attempting to capture and transmit a large number of events over a computer network to a remote computer used to analyze the events may result in overwhelming an available bandwidth of the network, or otherwise reaching or exceeding available computational resources.

For these and other reasons, complex event processing techniques have been developed in which combinations of individual events which occur in a certain order and/or within a certain time window are used to determine desired information. In this way, users may be provided with high-level information, relative to information that may be available with respect to any individual event. Moreover, by determining such high-level information from combinations of events, requirements for processing, storing, and/or transmitting such high-level events may be reduced relative to similar requirements for the underlying, individual events.

In order to deduce, infer, or otherwise determine high-level information from a combination of events within a particular timeframe, complex event processing techniques generally rely on complete, accurate, and timely transmission of events, e.g., within a computer network. For example, it may occur that one or more sensors may detect and transmit a plurality of events, and may transmit messages related to the events to a common location within the network, e.g., to a network computer which is configured to perform complex event processing with respect to the detected events. As referenced, such complex event processing may include the determination of desired information from, e.g., relationships between specified subsets of events within a defined period of time. Consequently, if some or all of the events are not received in a timely manner, and/or are received in an order which does not reflect an actual order of detection of the events, then the resulting complex event processing may produce erroneous results. For example, network delays, e.g., delays associated with a failure or other malfunction of one or more network computers responsible for transmitting the event, may cause a subset of events to be received out of order relative to one another and to an order of occurrence of the events. In these and related scenarios, many of the features and advantages of complex event processing may be mitigated or lost.

SUMMARY

According to one general aspect, a system may include instructions recorded on a computer-readable medium and executable by at least one processor. The system may include a message handler configured to cause the at least one processor to receive a plurality of messages associated with a plurality of events, the events having a temporal relationship to one another. The system may include a header inspector configured to cause the at least one processor to extract latency information from the plurality of messages, the latency information characterizing a transmission duration experienced by each message in traveling from the one or more source nodes through the network. The system may include a window manager configured to cause the at least one processor to correct a disruption in the temporal relationship between at least two events of the plurality of events, the disruption including relative differences in the transmission duration experienced by the at least two events, including relating the at least two events to a time window for processing the at least two events, and an event processor configured to cause the at least one processor to process the at least two events relative to the time window.

According to another general aspect, a computer-implemented method for executing instructions stored on a computer readable storage medium may include receiving a plurality of messages associated with a plurality of events, the events having a temporal relationship to one another, and extracting latency information from the plurality of messages, the latency information characterizing a transmission duration experienced by each message in traveling from the one or more source nodes through the network. The method may include correcting a disruption in the temporal relationship between at least two events of the plurality of events, the disruption including relative differences in the transmission duration experienced by the at least two events, including relating the at least two events to a time window for processing the at least two events. The method may further include processing the at least two events relative to the time window.

According to another general aspect, a computer program product may be tangibly embodied on a computer-readable storage medium and may include instructions that, when executed, are configured to receive a plurality of messages associated with a plurality of events, the events having a temporal relationship to one another. The instructions, when executed, may be further configured to extract latency information from the plurality of messages, the latency information characterizing a transmission duration experienced by each message in traveling from the one or more source nodes through the network. The instructions, when executed, may be further configured to correct a disruption in the temporal relationship between at least two events of the plurality of events, the disruption including relative differences in the transmission duration experienced by the at least two events, including relating the at least two events to a time window for processing the at least two events. The instructions, when executed, may be further configured to process the at least two events relative to the time window.

The details of one or more implementations are set forth in the accompanying drawings and the description below. Other features will be apparent from the description and drawings, and from the claims.

DETAILED DESCRIPTION

Figure 1:
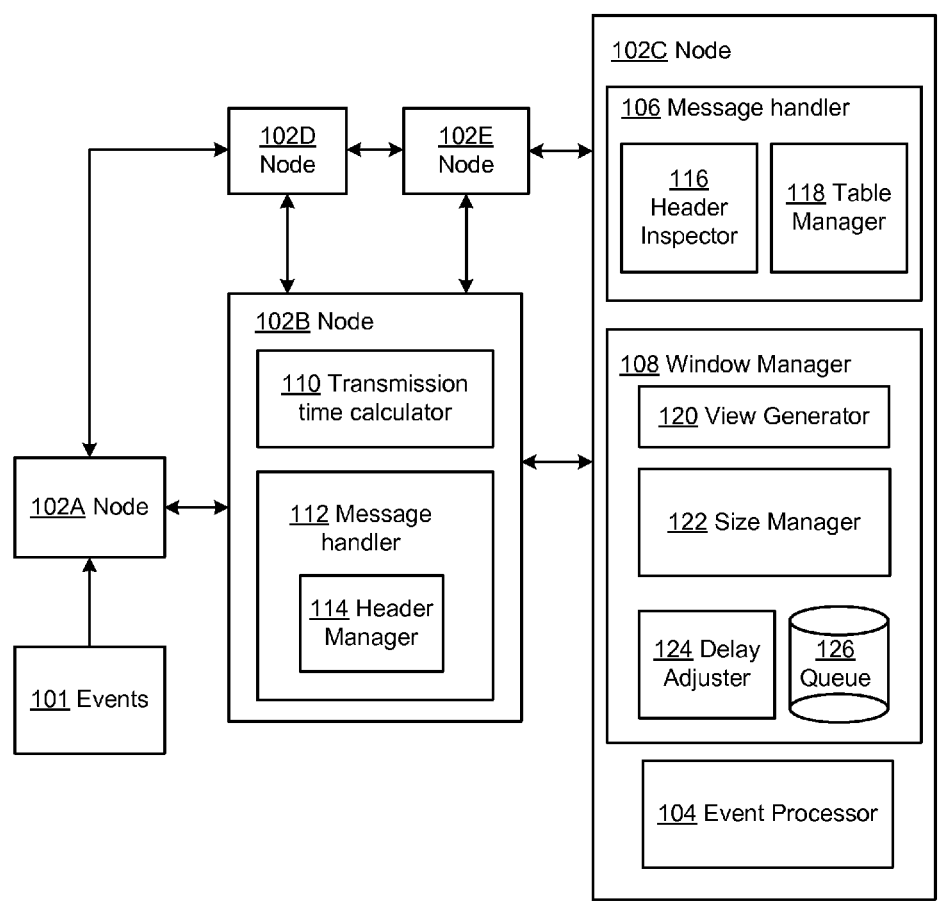
FIG. 1 is a block diagram of a system for window management in complex event processing.

FIG. 1 is a block diagram of a system 100 for providing window management during complex event processing. More specifically, the system 100 provides such window management in a manner which reflects effects of network transmission delays, which would otherwise result in erroneous results. Consequently, the system 100 may provide the advantages of complex event processing, even in the presence of network transmission latencies, hardware/software failures experienced within a network, or other sources of network transmission delays.

In the example of FIG. 1, a plurality of events are detected, transmitted, and/or processed using one or more nodes of a network of nodes represented in FIG. 1 by nodes 102A-102E. As referenced above, and as is generally known, the events 101 may represent, e.g., high rate event streams which are designed to integrate sensor data into backend applications. The use of such event streams, by themselves, is well known, e.g., in the context of various domains, e.g., business process management, manufacturing, surveillance, or item tracking within logistic chains. By processing the stream of events 101, developers and other users may be enabled to find and detect high-level application-relevant events which include sequences of low-level sensor events. In this way, correlations and other relationships between various subsets of thousands or millions of detected events may be recognized and analyzed, so as to thereby provide specific, desired high-level information to an end user.

By way of further example, complex event processing may be utilized for real-time network threat detection, transportation optimization, online commerce, or smart grid power management. In these and other contexts, query languages have been developed which enable users to issue queries against the stream of events 101, to thereby allow the users to define and detect desired subsets of the events 101, and various patterns and relationships there between. Although a number of additional general and specific examples of the events 101 and of complex event processing in general are provided below, it will be appreciated that these examples are intended to be non-limiting, and are provided merely for the sake of example and explanation.

In the example of FIG. 1, the node 102C is illustrated as including an event processor 104, which may be configured to process received events as described herein. For example, in some implementations, the event processor 104 may represent a centralized location at which events from throughout the system 100, or portions thereof, are collected for processing.

In the example of FIG. 1, however, and in many of the examples that follow, the event processor 104 is illustrated and described as being implemented on many or all of the nodes 102A-102E of the system 100, in the context of a distributed event processing architecture. For example, the nodes 102A-102E of the system 100 may be implemented as a peer-to-peer (P2P) network, in which the nodes 102A-102E may be connected in many-to-many relationships, e.g., such that no central point of control and/or global view of the system 100 need be provided. By implementing the system 100 in the context of a distributed, peer-to-peer network, the system 100 may be implemented in a manner that is scalable, robust, and designed to reduce an overall volume of data transmission and/or storage.

In practice, as described herein, the event processor 104 may generally be configured to analyze defined events (or lack thereof) with respect to an associated time window, or window. For example, in an example scenario in which the events 101 are related to equity markets, the event processor 104 may be configured to detect a trading pattern associated with a particular stock or other equity. For example, the event processor 104 may be configured to detect when a price of a particular stock exceeds a certain value, and to thereafter determine whether an associated trading volume exceeds a defined value within a specific time period.

In these and many other example scenarios, some of which are described herein, it may be appreciated that the two specified events (i.e., price and volume exceeding defined thresholds) may be detected by, or in association with, one or more of any of the nodes 102A-102E. That is, for example, although the events 101 are illustrated as being received only at the node 102A, it may be appreciated that, in fact, events may be received using any one of the nodes 102A-102E. Subsequently, data related to the events may be encapsulated or otherwise included within one or more corresponding messages, which may thereafter be transmitted throughout the system 100, until such time as corresponding events are thereby received at the event processor 104 of the node 102C.

As long as the messages are received at the event processor 104 in a timely, ordered, and representative fashion, the event processor 104 may proceed with conventional event processing techniques. However, in example scenarios, one or more of the relevant messages may be delayed during its transmission through the system 100. For example, in the simplified example provided above, it may occur that the message related to the trading volume of the stock in question may be delayed relative to transmission of the message relating to the price of the stock. In such a scenario, the event processor 104 may not receive the message regarding the trading volume until after the specified time window with respect to the price notification has elapsed. In such a case, the event processor 104 may fail to detect the existence of the desired and defined event relationship.

More generally, it may be appreciated that any such delay or latency within an underlying network transporting event messages within the system 100 may impact an accuracy of the resulting event processing. For example, as in the example just provided, such delays may result in the detection of false negatives, in which a specified event occurs but is erroneously not identified. Conversely, such delays may create false positives, in which a specified event does not occur, but is nonetheless erroneously identified as having occurred. Specific examples of these and other types of event processing errors are provided below.

In the example of FIG. 1, a message handler 106 at the node 102C may be configured to receive incoming messages used to transport the events 101, and to extract information therefrom which enables the node 102C and the event processor 104 to adapt to the types of delays which may occur in the context of the system 100, as described above. More specifically, as described herein, the message handler 106 may forward the extracted latency-related information to a window manager 108, which may generally be configured to compare the latency information with expected latency information, so as to adapt, in real-time or near real-time, the temporal interval (e.g., window) relative to received events, or, conversely, may be configured to adjust the received events relative to the temporal interval. In this way, the window manager 108 may ensure that the event processor 104 receives the relevant events in a manner which accurately reflects temporal relationships there between. In this way, the event processor 104 may proceed with executing otherwise-conventional complex event processing, and may provide accurate real-time (or near real-time) analysis, even in the presence of the types of intervening network delays referenced herein.

Specifically, in the example of FIG. 1, some or all of the nodes 102A-102E may be configured to update each message containing one or more events to include latency information characterizing the transmission of the message through the network of the system 100. In this way, as messages are transmitted from node to node through the network from a source node to a target or sink node, each message may be incrementally updated each time the message traverses an intervening node.

For example, in the example of FIG. 1, events 101 are received at, or generated in conjunction with, the node 102A, which therefore represents a source node in the sense described above. Subsequently, the resulting messages created at the source node 102A may be transmitted to the node 102B, and ultimately to the target or sink node 102C for processing thereby using the event processor 104. As just described, the node 102B may be configured to update latency information associated with the network transmission of each message from the source node 102A to the target node 102C. In this way, upon receipt at the node 102C, the message handler 106 may extract the latency information from each received message, so that the window manager 108, as referenced above and described in detail herein, may thereafter utilize the accumulated latency information to adjust a timing, order, or other relationship of the received events relative to one another and/or relative to the time window.

In this way, the event processor 104 may provide accurate complex event processing, even in the presence of network latencies, failures, and other network delays. Moreover, the system 100 enables the event processor 104 to provide such accurate complex event processing, without requiring that a global or universal clock or time scale be created or maintained with respect to the system 100 as a whole. Instead, as described, the system 100 utilizes incremental updates to event messages, as the message traverse each top along a network pass from a source node to a target or a sink node. Consequently, the advantages and benefits of accurate complex event processing may be provided in a manner that is relatively inexpensive, cost effective, and scalable. In particular, the described example implementations enable the use of the system 100 in the context of a peer-to-peer network, thereby providing the various features and advantages thereof, including, e.g., scalability, adaptability, low cost, and various other described and/or well known advantages of peer-to-peer computing platforms.

In this context, it may be appreciated that the term latency may refer to virtually any characterization of a time required to transmit a given message between any two or more of the nodes 102A-102E. For example, latency may be calculated in absolute terms, e.g., as a measure of time required to transmit the message from a first node to a second node of the system 100. In other examples, latency may be measured as a relative delay, e.g., may be measured with respect to a default or expected transmission time between any two nodes of the system 100. Accordingly, latency may be measured or represented in virtually any suitable unit or metric. For example, latency may be measured in seconds, or may be measured with respect to a number of hops used by a given message in traversing from one node to another node within the system 100.

Numerous known factors may contribute to a transmission time, and thus a latency, of a message transmitted between two nodes of the system 100. For example, transmitted messages may experience delays at various layers of a network stack, e.g., at a physical layer, a network layer, a transport layer, an application layer, or a server/OS layer. Such factors associated with network transmissions, and network delays, are, by themselves, generally well known, and are therefore not described herein in detail. In general, however, it may be appreciated that such factors may be unpredictable in time and/or extent. For example, delays may occur at an unexpected time or in an unexpected manner, e.g., such as when the node 102B experiences a hardware or software failure, or experiences a power outage or other occurrence which disrupts message transmission. Moreover, such delays may have a short or a long duration before normal operation is commenced again, and may occur numerous times within a relatively short timeframe, or may occur more rarely within a given time period. Similarly, delays caused by constraints on bandwidth and other resources may occur in a manner that is difficult to predict or characterize in advance, e.g., may occur in response to various user actions implemented in the context of the system 100 (e.g., such as when a user requires a substantial portion of network resources).

In the example of FIG. 1, the node 102B is illustrated as including a transmission time calculator 110 and a message handler 112. As may be understood from the above, and as described in detail below, these and additional or alternative components may be utilized to incrementally update messages traversing the node 102B during network transmissions in the manner described above, and for the purpose of enabling desired operations of the window manager 108 in providing the event processor 104 with an ability to execute accurate complex event processing of the events 101. Specifically, for example, the transmission time calculator 110 may be configured to determine, track, and maintain average transmission times between the node 102B and any and all other individual nodes which are connected by a single hop with the node 102B. For example, the node 102B may utilize the transmission time calculator 110 to store average transmission times between the node 102B and the node 102A, between the node 102B and the node 102D, between the node 102B and the node 102E, and between the node 102B and the node 102C.

For example, the transmission time calculator 110 may be configured to analyze actual messages sent between each such pair of nodes, and to record an average value for such transmission times. In additional or alternative embodiments, the transmission time calculator 110 may be configured to send individual communications to each connected node 102A and 102C-102E, specifically for the purpose of calculating and collecting the corresponding average transmission times. Consequently, upon receipt of a message which includes or characterizes an event of the events 101, as received from the node 102A, the message handler 112 may utilize the transmission time information provided by the transmission time calculator 110 to update a header of the received message, e.g., using a header manager 114, to thereby include the average transmission time between the node 102A and the node 102B.

Although not specifically illustrated in the example of FIG. 1, it may be appreciated that any of the nodes 102A-102E, or other nodes included in the system 100, may include the transmission time calculator 110 and message handler 112. Consequently, as each message is passed from node to node within the system 100, a message handler of each node may incrementally update a total or aggregate transmission time experienced by the message as it traverses among the nodes of the system 100. For example, the message sent by the node 102A to the node 102C via the nodes 102D, 102E may initially be updated upon receipt at the node 102D as being associated with an average transmission time between those two nodes, as maintained by a transmission time calculator 110 of the node 102D. Subsequently, and similarly, the node 102E may add an average transmission time between the nodes 102D, 102E to the already-added transmission time included by the node 102D. Finally, the node 102C may similarly add a transmission time associated with transmission between the nodes 102E and the node 102C. In this way, the message transmitted from the node 102A via the nodes 102D, 102E to the node 102C may arrive at the node 102C with a header which includes a total or aggregate transmission time associated with its path through the system 100.

Additionally, or alternatively, the message handler 112 and the header manager 114 may be configured to increment a number of hops experienced by a message in its path through the nodes of the system 100. For example, the message generated by the node 102A and received at the node 102B may have its header updated by the header manager 114 to reflect that the message has undergone one hop. Of course, from this explanation, it may be appreciated that the message following the above-described path through nodes 102D, 102E, may be incrementally updated at each node along that path, so that, upon arrival at the node 102C, a message header of the message in question accurately reflects a total or aggregated number of hops experienced by the message along its path from the node 102A through the system 100.

Thus, upon receipt of a message by the message handler 106 of the node 102C acting as a processing node with respect to corresponding events, the message handler 106 may execute a header inspector 116 which is configured to inspect a header of the received message, and to extract latency information included therein. For example, it may be appreciated from the above description that the header inspector 116 may be configured to extract either or both of the accumulated transmission time and/or the accumulated number of hops experienced by the message in traversing its path through the nodes of the system 100.

In the example of FIG. 1, a table manager 118 may be configured to maintain a table which contains most-recent information regarding a path length and/or average latency associated with reception of an event from a specific node of the system 100 acting as an event source, e.g., the node 102A receiving the events 101 in the example of FIG. 1. As may be appreciated, and as described in detail below, such information maintained by the table manager 118 may be utilized for comparison of latency information associated with the most recent message.

That is, for example, the table manager 118 may maintain an average transmission duration and number of hops associated with messages received from the node 102A, based on a most recent set of messages received from the node 102A. Then, upon receipt of a current message, the differences in these parameters with respect to the current message, as compared to collected, previous values for these parameters, will be apparent.

For example, it may occur that messages from the node 102A may experience, for a period of time, a network transmission path which includes only the node 102B, and this information may be tracked and maintained by the table manager 118. At a given time, the node 102B may experience a failure, so that a current message from the node 102A must traverse nodes 102D, 102E. Consequently, upon extraction of this information by the header inspector 116, the window manager 108 may readily determine the associated disruption and a temporal relationship of the current message and its associated event, relative to previously-received events.

For example, in a simplified example, it may occur that events are received at a rate of one per second at the node 102A, so that, as long as the events are transmitted consistently through the system 100, the event processor 104 will process the events at a rate of one per second, as well. However, in the example scenarios just described in which the node 102B experiences failure, then a current message which must traverse the network over the nodes 102D, 102E will be received at the node 102C at a time which is greater than one second from receipt of a previous event.

However, it is apparent in this scenario that the resulting difference in the temporal relationships between the events is not related to any actual change in the cause or source of the event, but rather to the network disruption experienced by the failure of the node 102B. Consequently, as described herein, the window manager 108 may be configured to utilize the latency information extracted from the current message, as well as the latency information maintained by the table manager 118, to correct for such disruptions in the temporal relationships of the received events. In this way, the event processor 104 may proceed with processing the received events accurately, and in a manner which reflects the actual order, timing, and other relationships of the events as they occur.

For example, the window manager 108 may include a view generator 120 which may be configured to display or otherwise provide the above-referenced latency information and/or associated discrepancies or other disruptions associated with two or more events. Moreover, as described in detail below, the view generator 120 may be configured to provide such information relative to a time window for processing the event. In this way, any such disruptions may be corrected, so that processing of the events with respect to the time window may proceed in a desired manner.

In some example implementations, a user of the system 100 may view or otherwise receive such information from the view generator 120, and may manually enter corrections (or direct the use of techniques implementing automatic corrections) which compensate for the discrepancies or disruptions experienced by the events during transmissions thereof through the system 100. In additional or alternative examples, the window manager 108 may be configured to provide such corrections automatically, using one or more techniques described herein, or other techniques, and without necessarily utilizing the view generator 120 for the purpose of displaying the disruptions as such.

For example, the window manager 108 may include a size manager 122 which may be configured to adjust a size of a relevant time window utilized for processing received, related events. In a simple example, for example, the events 101 may occur at approximately one second intervals, and the event processor 104 may be configured to process the events with respect to a time window which is three seconds long, and which begins with receipt of a first one of the events.

In such a case, it may occur that a third of three events may be delayed in a transmission through the system 100, such as above when the node 102B fails after transmission of the second event but before transmission of the third event. In such a case, the event processor 104 might normally receive the third event well after the end of the three second time window. However, the size manager 122 may be configured to extend the time window beyond a nominal three second duration originally provided, based on the latency information received from the message handler 106. In other words, for example, the size manager 122 may extend the relevant time window in an amount which is sufficient to capture the third event and reflect the determined latency information, without extending the time window to such an extent as to capture other kinds of subsequent events which would not normally have been intended to be processed within the time window. In this way, the event processor 104 may proceed with an otherwise normal processing of the received events, but using the extended time window provided by the size manager 122.

In another example of operations of the window manager 108, a delay adjuster 124 may adjust a timing and/or order of received events relative to one another, so as to accurately reflect an actual timing, order, or other relationships between the events as they actually or originally occurred. For example, a queue 126 may be utilized to store incoming events perceived by way of message handler 106. In a specific example, similarly to the examples above, it may occur at a given point in time after failure of the node 102B that events are received by way of the longer network path which includes the nodes 102D, 102E. Subsequently, the node 102B may be restored, and a next or current event may again may be transmitted by way of the shorter network path which includes only the node 102B. In this case, a later event may be received before an earlier event which was forced to take the longer network path.

Thus, in these and various other examples, it may occur that the queue 126 initially receives and stores events in an order which does not reflect an actual or original generation or occurrence of the events. Similarly, it may be appreciated that the events may be received, as described above, in other ways which do not accurately reflect the original occurrence thereof, e.g., may be received at an interval of two seconds, even though actual event occurrence happened at an interval of one second.

In these and other scenarios, the delay adjuster 124 may be configured to extract sets of events from the queue 126, and to reorder, rearrange, or otherwise reconfigure the events relative to one another, so that the event processor 104 thereafter may proceed with processing of the events within an otherwise normal or standard time window. For example, in the example provided above in which events occur at one second intervals and yet a current or most recent event is received at an interval of approximately two seconds from a proceeding event, the delay adjuster 124 may alter a time stamp or other timing relationship of the current event so as to occur at a one second interval from its preceding event, based on the latency information and associated information from the table manager 118, as described above.

In this way, the delay adjuster 124 may permit the window manager 108 to provide the events in their original, correct intervals to the event processor 104. In such scenarios, the event processor 104 may utilize an originally designed time window for processing the received events.

It may be appreciated that variations of the system 100 of FIG. 1 may be implemented in which any two of the illustrated components of FIG. 1 are executed using a single component. Conversely, and similarly, it may be appreciated that variations of the system 100 may be implemented in which any one of the individual components illustrated may be executed using two or more subcomponents to achieve the same or similar functionality. Moreover, although FIG. 1 illustrates a particular, simplified example for the sake of explanation, it may be appreciated that many additional or alternative components may be included in the system 100, e.g., in any one or more of the nodes 102A-102E, and/or that any given one of the components of the illustrated system 100 may be omitted in such variations of the system 100 (in particular, as referenced herein, any of the nodes 102A-102E may include some or all of the components 104-126).

Nonetheless, in such variations of the system 100, it may be appreciated that users thereof may be provided with the ability to perform accurate complex event processing, even in the presence of network failures and other causes of transmission delays experienced by transmitted messages, even when such disruptions or delays are unpredictable in terms of timing and/or frequency of occurrence. Further, the system 100 may be implemented in the context of a decentralized, peer-to-peer network, and may therefore enjoy the various features and advantages associated therewith, including, e.g., scalability, ease of use, and robustness.

Figure 2:
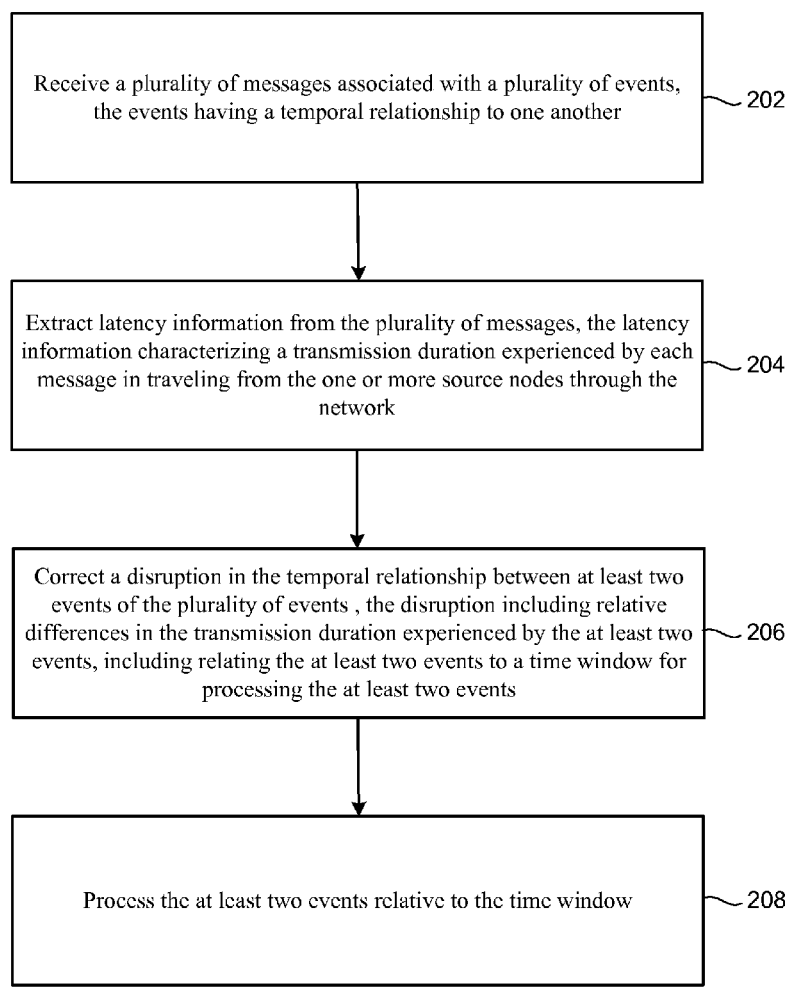
FIG. 2 is a flowchart illustrating example operations of the system of FIG. 1.

FIG. 2 is a flowchart 200 illustrating example operations of the system 100 of FIG. 1. FIG. 2 illustrates example operations 202-208 as separate, sequential operations. However, it may be appreciated that in alternative embodiments, two or more of the illustrated operations may occur in a partially or completely overlapping or parallel manner. Further, it may be appreciated that operations may be performed in a nested, iterative, or looped fashion. Moreover, additional operations, not specifically illustrated in the example of FIG. 2, may be included in addition to, or in place of, one or more of the illustrated operations, and/or one or more of the illustrated operations may be omitted.

In the example of FIG. 2, a plurality of messages associated with a plurality of events may be received, the events having a temporal relationship to one another (202). For example, the message handler 106 may be configured to receive messages associated with the events 101, from the node 102A acting as a source node with respect thereto.

Latency information may be extracted from the plurality of messages, the latency information characterizing a transmission duration experienced by each message in traveling from the one or more source nodes through the network (204). For example, the header inspector 116 of the message handler 106 may be configured to extract latency information from a header of each received message. As illustrated and described with respect to FIG. 1, such latency information may include, e.g., a total accumulated time of transmission associated with a traversal of each message through the system 100, as added incrementally by each node traversed. Additionally, or alternatively, the latency information may include a number of hops experienced by each message in traversing the system 100, where again the number of hops may be added incrementally at each node, as the message traverses the nodes. In this way, these and other types of latency information may characterize an amount of time, a number of nodes, or other representation or characterization of a duration of time experienced by each message in traversing from the node 102A to the node 102C.

A disruption in the temporal relationship between at least two events of the plurality of events may be corrected, the disruption including relative differences in the transmission duration experienced by the at least two events, including relating the at least two events to a time window for processing the at least two events (206). For example, the window manager 108 may be configured to correct any delays experienced by a given event relative to another event which is related for purposes of processing within the context of a predefined time window.

In this way, the at least two events may be processed relative to the time window (208). For example, the event processor 104 may be configured to determine or derive desired information based on the occurrence (or non-occurrence) of one or more events within the predefined time window, based on the corrected disruption.

Figure 3:
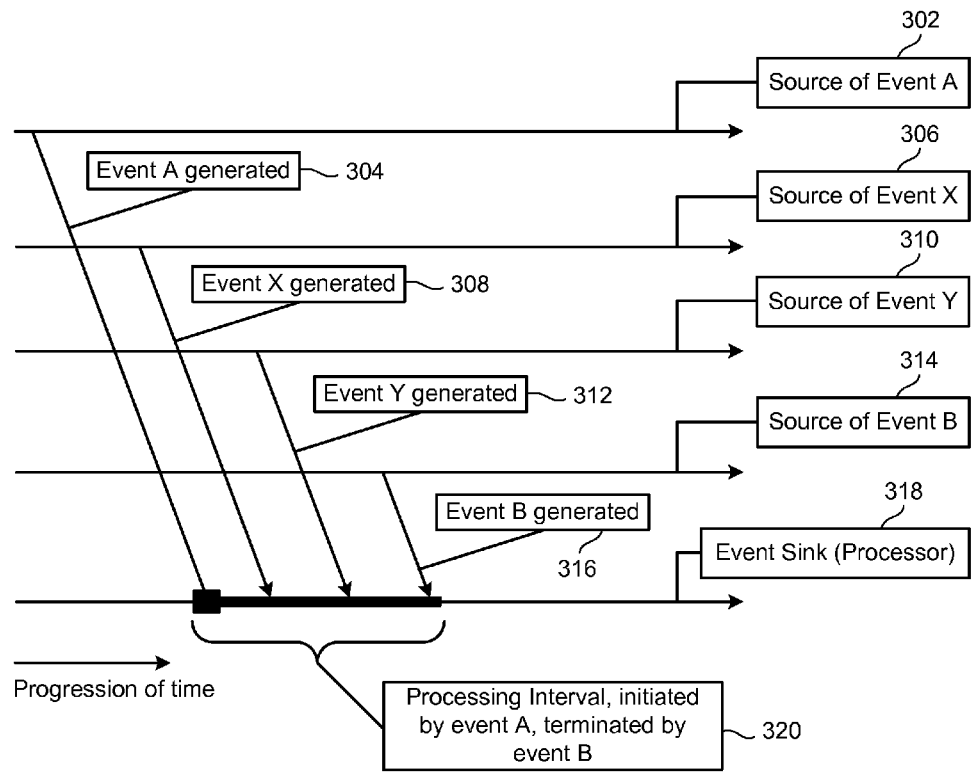
FIG. 3 is a timing diagram illustrating a window of events.

FIG. 3 is a timing diagram illustrating a bounded time window. Specifically, as shown in FIG. 3, a source 302 of an event A304 may provide or generate the event A304 at a first time. Similarly, and subsequently, a source 306 of event X may generate the event X308 at a second time. A source 310 of event Y may generate the event Y312 at a third time. Finally in FIG. 3, a source 314 of event B may generate the event B at a fourth time 316.

Thus, as shown and described, events may be generated in an order of A, X, Y, B. And, as shown, each event may be received at an event sink 318 in the same order. In the example, FIG. 3 thus illustrates a time window defined as a processing interval 320 which is initiated by event A 304, and terminated by event B 316.

With respect to the context of the system 100 of FIG. 1, it may be appreciated that the sources 302, 306, 310, 314 of FIG. 3 may represent one or more of the nodes 102A, 102B, 102D, 102E of FIG. 1, while the event sink 318 may represent the node 102C of FIG. 1, which receives messages corresponding to the events 304, 308, 312, 316 for processing by the event processor 104 with respect to the time window of the processing interval 320. Thus, in the example of FIG. 3, the time window used to process events is defined as a processing interval which is bounded by two events, i.e., the event A304 and the event B316, and which may capture and include any intervening events 308, 312 which may be received within the thus-bounded processing interval 320.

Examples of such bounded processing intervals are well known, by themselves, and are generally too numerous to mention here in detail. However, as referenced above, such bounded intervals may include, e.g., a period during which a server is down, a trading day of an equities market, or a period during which a vehicle exceeds a speed limit. Thus, in the above examples, the event A304 may represent an event associated with a failure of the server, while the event B represents an event associated with the server coming back online. In the other examples provided above, the events 304, 316 may represent an opening and closing trade respectively, or may represent a first time at which a vehicle exceeds a speed limit and a time at which the vehicle begins traveling at or below the speed limit again.

Figure 4:
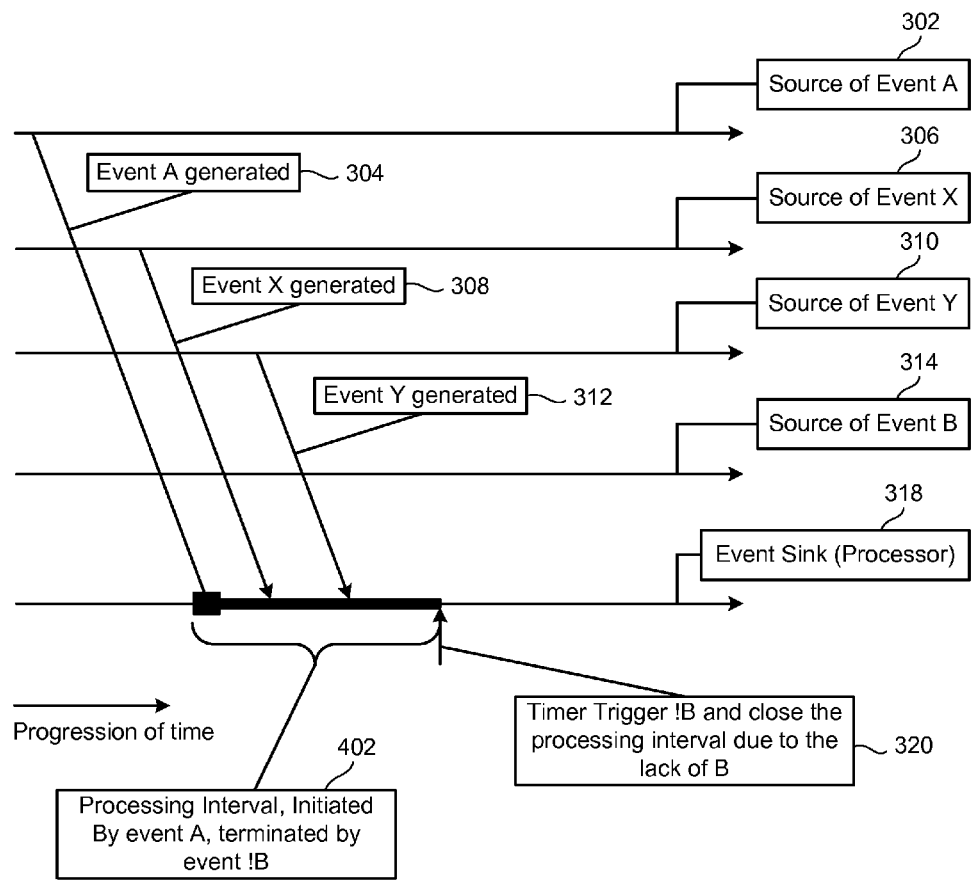
FIG. 4 is a second timing diagram illustrating a window of events.

FIG. 4 illustrates a variation of the example of FIG. 3, in which a time window is defined by a processing interval 402 which is bounded by the event A304 at a beginning, and by a failure of receipt (i.e., non-receipt) of the event B316 at an end of the processing interval 402. In other words, as shown, a timer-based trigger 404 may be configured to close a processing interval 402 due to the lack of receipt of the event B316 (where such a failure to receive an event may be designated by a preceding exclamation mark, e.g., by the notation !B).

Thus, FIGS. 3 and 4 together illustrate that a defined time window during which generated events are relevant may be determined either by the occurrence of the event B316, as shown in FIG. 3, or by the non-occurrence of event B (!B, as shown in FIG. 4). The thus-defined processing interval may thus be understood to be terminated either on the occurrence of the terminating event B316, or when the processing interval expires, as defined by a maximal length of time and the associated creation of a non-event !B.

Figure 5A:
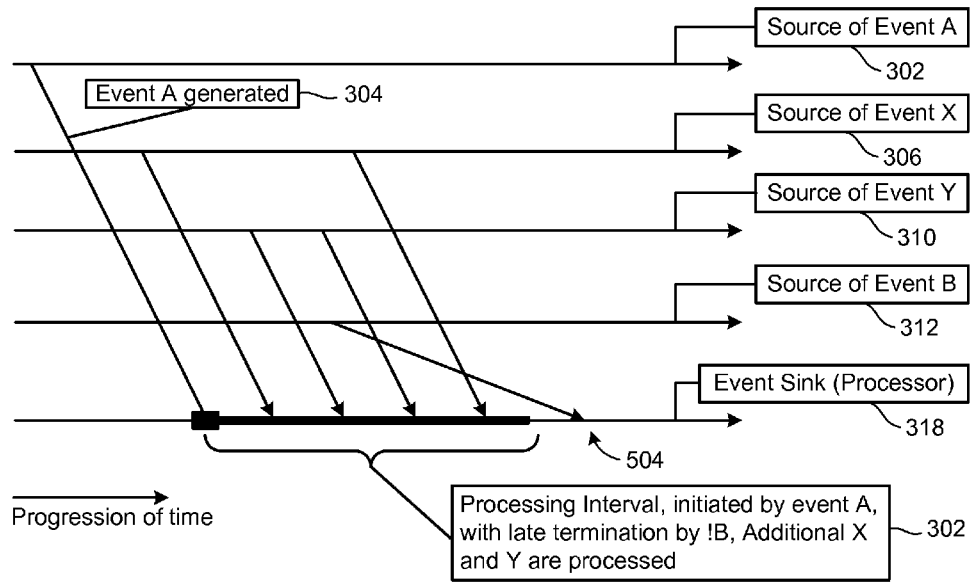
FIGS. 5A-5C are additional timing diagrams illustrating event windows.
Figure 5B:
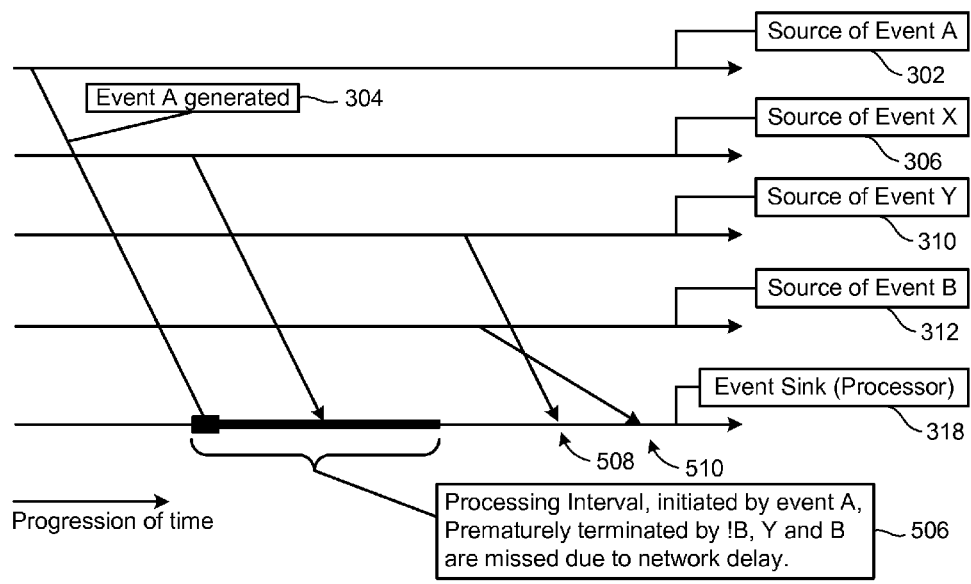
Figure 5C:
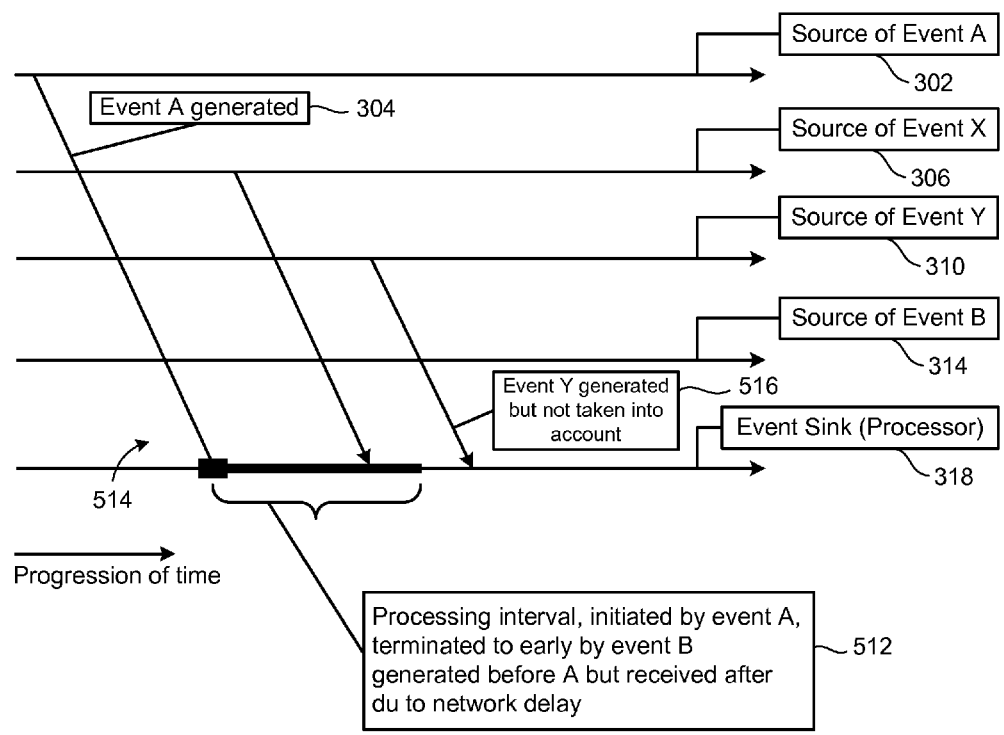

In these contexts, FIGS. 5A-5C provide illustrations of examples of types of errors which may be experienced due to a network delay in transmitting the various events from one or more source nodes to the recipient node 102C. Specifically, as shown, FIG. 5A illustrates an example in which a processing interval 502 is defined in an incorrect manner, due to a delay of an event B504 generated by the event source 314. That is, as shown, in the example of FIG. 5A, the processing interval 502 is initiated by the event A304 as described above with respect to FIGS. 3-4. In the example, the processing interval 502 should be terminated by occurrence of the event B504, as described and illustrated above with respect to FIG. 3, and thereby including intervening events received from the sources 306, 310.

In the example, however, the event 504 is delayed in its transmission, e.g., for one or more of the various reasons described herein so that the processing interval continues until being terminated at the maximum termination point !B. By this time, as shown, additional events from the sources 306, 310 have been received, and included within the processing interval 502. As may be observed, then, the second pair of events from the sources 306, 310 should not, in fact, be included within the processing interval 502, and are only included due to the late arrival of the event 504.

In the example of FIG. 5B, a processing interval 506 is illustrated which is initiated by the event A304, and which is prematurely terminated by reaching the maximal termination point !B. In the example, events 508, 510 are delayed in their transmission through the associated network, and therefore are erroneously not included within the processing interval 506.

Meanwhile, in the example of FIG. 5C, an event 514 from the source 314 is illustrated as occurring prior to the initiating event A304. Nonetheless, as shown, due to network delay, the event 514 from the source 314 may in fact reach the event sink after the arrival of the event A304. Since generated by the source 314, the event 514 may be received at the event sink 318 as a terminating event B. Consequently, a processing interval 512 which is initiated by the event A304 is erroneously terminated early by the arrival of the delayed event B514. Consequently, the processing interval 512 ends before an arrival of an event 516 from the source 310, and therefore does not include the event 516 within the processing interval 512.

Figure 6A:
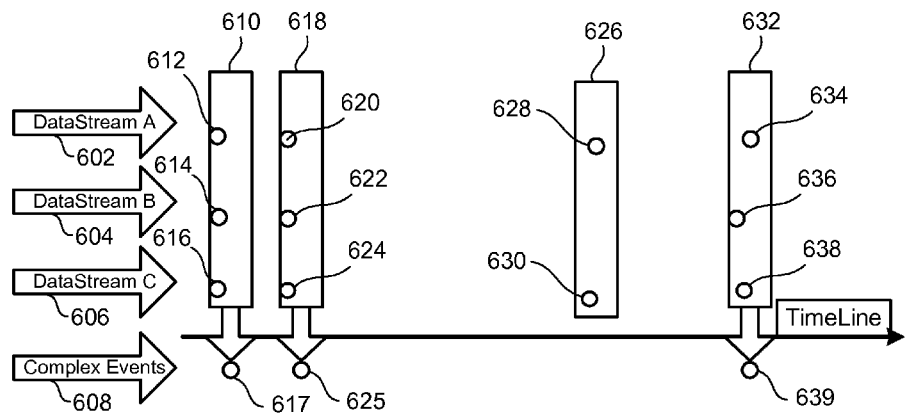
FIGS. 6A-6B illustrate potential errors associated with network latency during event processing.
Figure 6B:
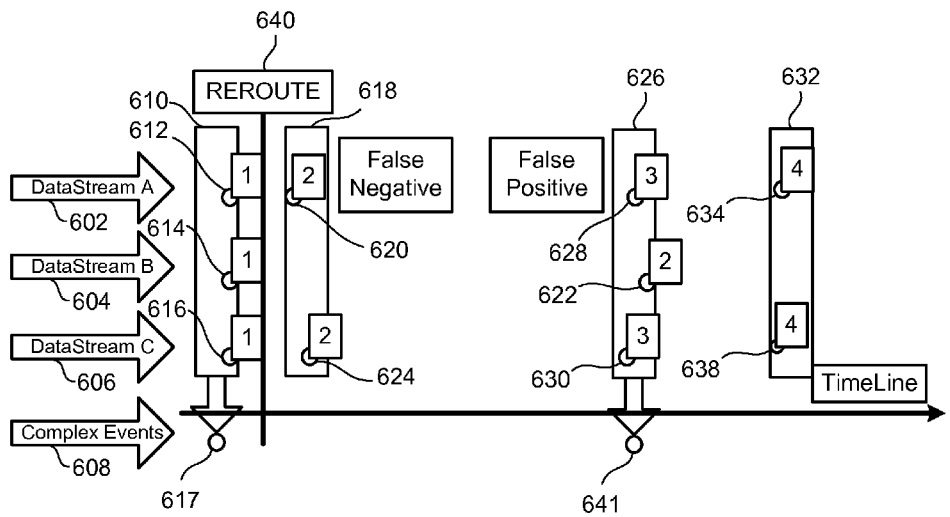

FIGS. 6A and 6B provide additional illustrations of errors which may be created by, or associated with, the types of network delays in transmitting event messages described herein. As shown in FIG. 6A, event streams 602, 604, 606 may represent three different streams of events. Complex events 608 represent relatively high level events which may be determined from the combination of events from the streams 602-606 within a specific time window. In a simple example for the sake of illustrating relevant content, the data stream A may be associated with events received on a first side of a door, events from the data stream 604 may be associated with a sensor detecting an opening of the door, and events from the data stream 606 may be associated with a sensor on a second side of the door. Then, for example, a time window 610 may be defined such that receipt of events 612, 614, 616 from the data stream 602, 604, 604 may be interpreted as a high-level event 617 which indicates the passage of a person into or out of a building which includes the door of the example. Similarly, a time window 618 is illustrated which captures events 620, 622, 624 from the data streams 602, 604, 606 respectively, so as to thereby determine or derive a high-level event 625.

However, as illustrated, with respect to a third time window 626, a first event 628 from the data stream 602 may be received in an expected and correct manner, while an event 636 of the data stream 604 may be delayed in its transmission through a relevant network, and therefore arrive within a time window 632. Meanwhile, an event 630 of the data stream 606 may be received accurately and correctly within the time window 626. Further with regard to the time window 632, as shown, an event 634 associated with the data stream 602 may be received accurately and correctly within the time window 632, and, similarly, an event 638 of the data stream 606 also may be received accurately and correctly within the time window 632.

Consequently, in the example, as shown, no complex event may be derived from event 628, 630 within the time window 626. However, as is apparent, the failure to derive a corresponding complex event is erroneous, and reflects the delay of the event 636. As a result, the failure to obtain a complex event associated with the time window 626 may be understood to represent a false negative result. Meanwhile, and conversely, the inclusion of the event 636 within the time window 632 may be understood to result in a similarly erroneous generation of a complex event 639, so that the complex event 639 represents a false positive result.

Similar comments apply to the example of FIG. 6B, in which events 612, 614, 616 are labeled as events of group 1 within window 610, while events, 620, 622, and 624 are labeled as events of group 2 and events 628/630 are included in a group labeled 3 and events 634, 638 are labeled as group 4. Then, event 622 is illustrated as arriving late, and within the window 626, thereby creating a false negative with respect to window 618 and a false positive result 641 with respect to window 626

Figure 7:
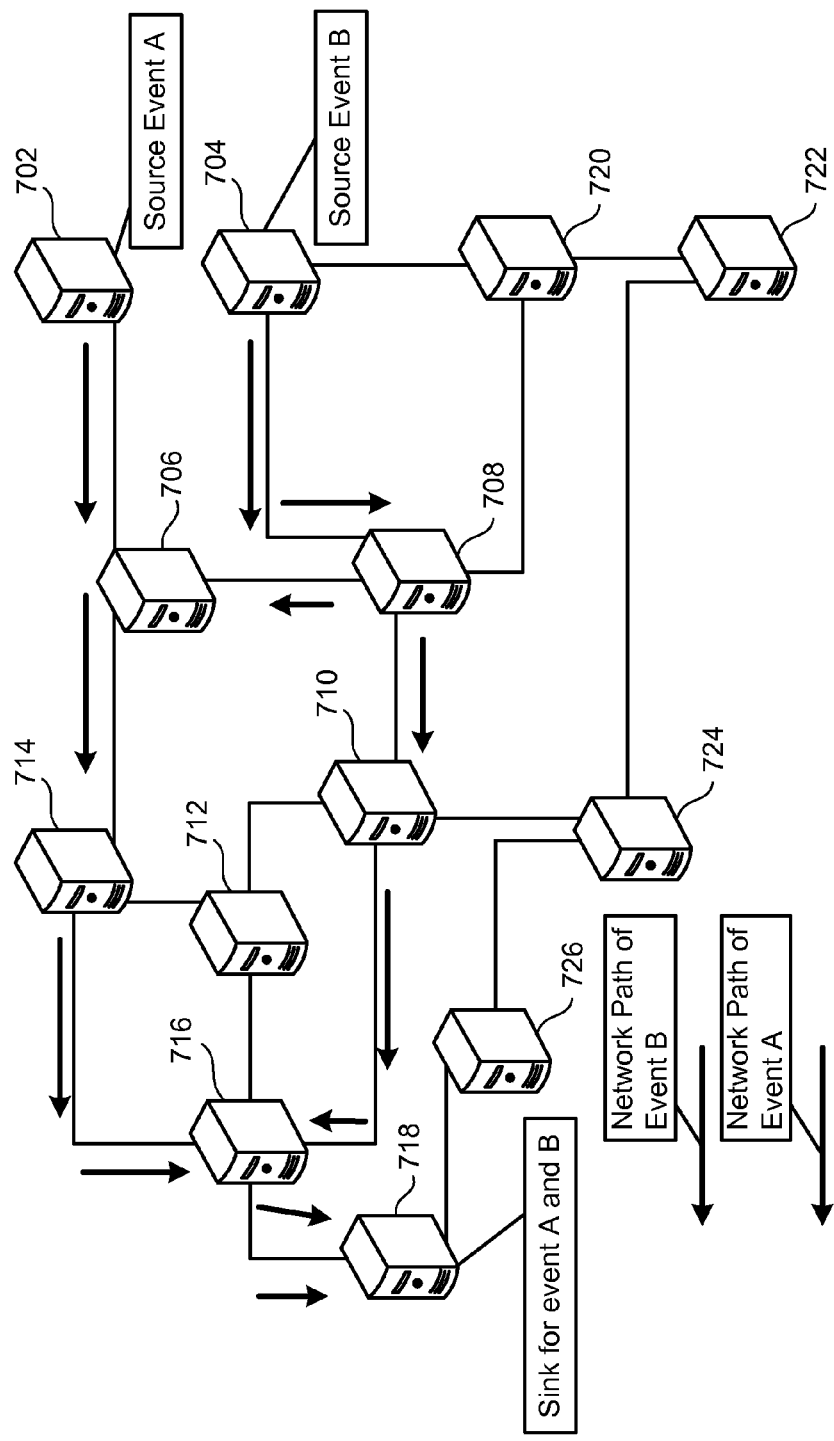
FIG. 7 is an architectural diagram illustrating a peer-to-peer implementation of the system 100 of FIG. 1.
Figure 8:
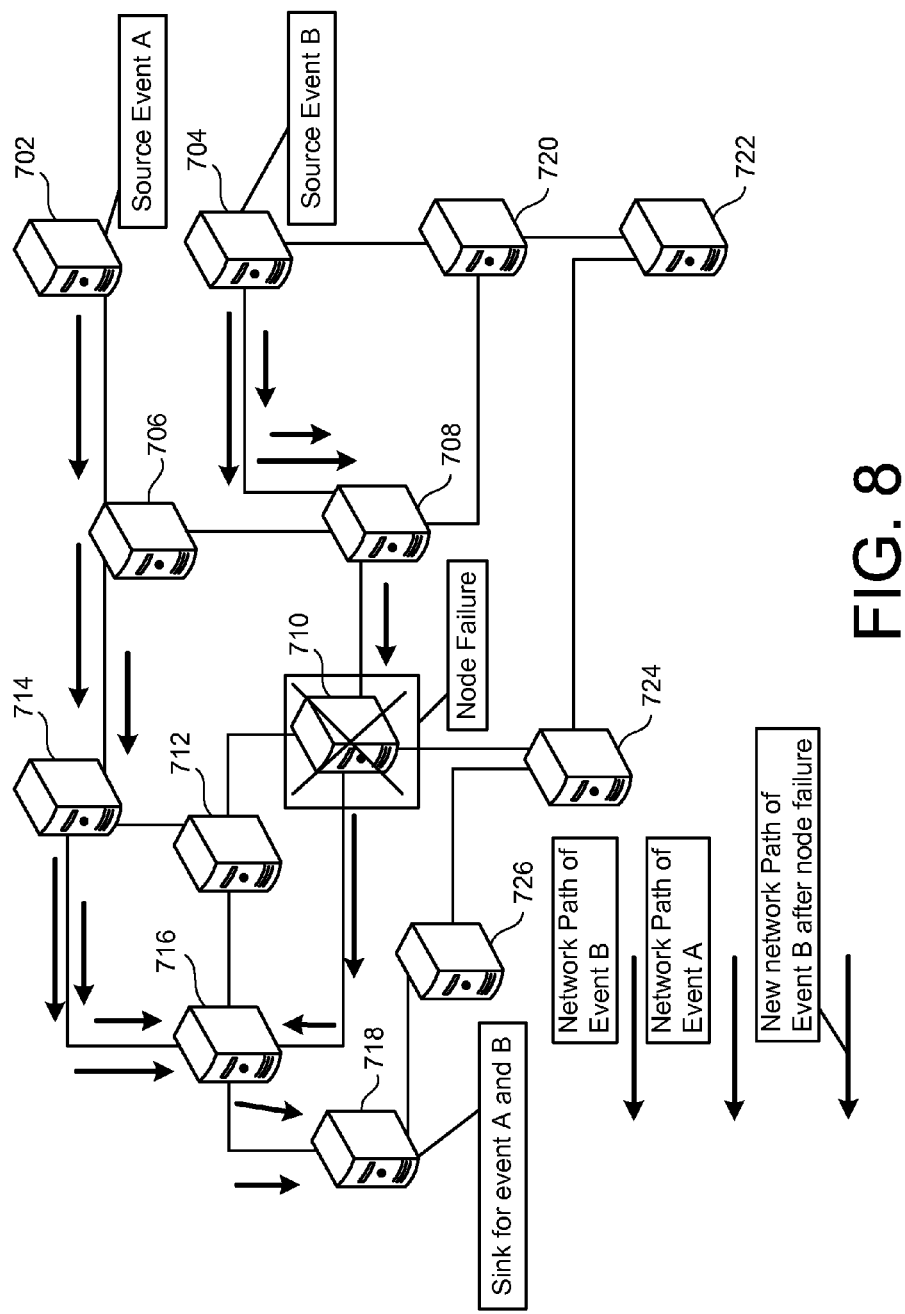
FIG. 8 illustrates a network failure of the network of FIG. 7.

FIGS. 7 and 8 illustrate an example implementation in which, as referenced above, various nodes of the system 100 may be connected together as part of a distributed, peer-to-peer network. Consequently, FIGS. 7 and 8 illustrate causes and types of errors related to the example scenarios of FIGS. 3-6, and the peer-to-peer environment in which messages do not follow a fixed aft through the network. That is, as referenced above, the very nature of peer-to-peer networks is to provide network resiliency and allow the network to cope with changes, failures, or additions of network nodes. However, the result of such network modifications of the underlying network topology is that, as just referenced, messages carrying events may take different paths between the same two network nodes over a given period of time.

Specifically, as shown, FIG. 7 illustrates nodes 702-726 which are connected in a peer-to-peer manner. In the example, the node 702 represents a source of an event A, e.g., the event A304 of FIG. 3. Similarly, the node 704 illustrates a source of the event B, e.g., the event B316 of FIG. 3.

Then, as shown, the network path of event A may proceed, in the example, from the node 702 and through the nodes 706, 714, 716, and thereby to the node 717 acting as the sink for the events A and B. Meanwhile, a network path for the event B may be established from the node 704 through the node 708, 710, 716, and thereby to the sink node 718.

In practice, for example, the node 718 may initially broadcast an interest in the event A, B through the illustrated network. The nodes 702, 704, as sources of events A, B, respectively, may communicate back to the node 718, through intervening nodes, that event A, B will be included within messages addressed for transmission through the network for receipt at the sink node 718. Subsequently, as illustrated in FIG. 7, and as referenced above, corresponding events from the nodes 702, 704 may precede along the illustrated network paths to the sink node 718.

As described above with respect to FIG. 1, any and/or all of the various nodes 702-726 may include any and/or all of the various components illustrated as being implemented by the nodes 102B, 102C of FIG. 1. For example, the node 718, representing the node 102C, may implement the message handler 106, the window manager 108, and the event processor 104. Meanwhile, the various intervening nodes 706, 714, 716 may implement the transmission time calculator 110 and the message handler 112 illustrated with respect to node 102B, and with respect to the transmitted messages which include event A. Similarly, in the example of FIG. 7, the nodes 708, 710, as well as the node 716 as just referenced, also may implement the transmission time calculator 110 and the message handler 112 illustrated with respect to the node 102B of FIG. 1. Thus, during initial operations of the example of FIG. 7, the various messages may be transmitted between the node 702, 704 and the node 718, and each such intermediate node may, as described with respect to FIG. 1, incrementally add latency information to each transmitted message, as each such message traverses the node in question.

To pick one node for the sake of example, the node 714 may utilize the transmission time calculator 110 to calculate average times of transmission between the nodes 706/714, the nodes 712/714, and the nodes 716/714. Then, upon receipt of a message from the node 706, the message handler 112 implemented by the node 714 may update a message header of the message so as to include the previously-determined average transmission time between the nodes 706/714 as being representative of an actual transmission time that was experienced by the message in traversing from the node 706 to the node 714. In other words, in the example, the node 714 need not be aware, or measured, an exact transmission time of the message from the node 706 to the node 714. Instead, in the example, the node 714 may rely on the previously-calculated average transmission time as a proxy which closely corresponds to the actual transmission time.

Similarly, of course, the message handler of the node 714, and of each intermediate node, may increment a member of hops experienced by the message. Again, as described herein, the node 714 may utilize the header manager 114 to modify a header of each traversing message to provide the above, and other, types of latency information within the header, or otherwise, within the traversing message.

As also described above, the sink node 718, representing the node 102C of FIG. 1, may include the message handler 106 which utilizes the header inspector 116 to extract the latency information which has accumulated within the message transporting the event A during traversal of the message from the node 702 along the node 706, 714, 716 to the sink node 718. Over time, the table manager 118 may utilize the thus-received latency information to construct a table which represents and describes existing transmission durations of the events of type A and B from the source nodes 702, 704, respectively through the illustrated and described network paths of the network of FIG. 7.

Subsequently, in the example of FIG. 8, the node 710 is illustrated as experiencing a node failure, and therefore becoming available, at least temporarily, for transmitting the next-received message associated with event B. In such a case, a network path taken by the message transporting event B may be understood to be longer by one hop. As a result, there is a greater chance that the time required to transport the message will also increase.

Specifically, as shown, the message transporting event B may traverse a new network path, including, as shown, traversing the nodes 708, 706, 714, and 716, before reaching the sink node 718. In such a case, as described, the relevant nodes may continue to incrementally update latency information of the thus-routed message.

Consequently, upon receipt at the sink node 718, the message handler 106 of the sink node 118 may proceed to extract such latency information from the message handler. Thereafter, the window manager 108 of the sink node 718 may proceed to compare the best ascertained latency information from the current message against the previously recorded latency information established by the table manager 118 with respect to relevant network paths through the network of FIG. 8.

Thus, as referenced above and as described in detail below, the window manager 108 of the sink node 718 may proceed to take corrective action to account for the fact that the current message during the event B from the source 704 may be received at a later time relative to the event A from the node 702 than would otherwise have occurred without the failure of the node 710. In this way, as described, the event processor 104 of the sink node 718 may proceed with calculating various desired complex events defined by, or with respect to, a time window defined relative to (e.g., bounded by) the events A, B.

Figure 9:
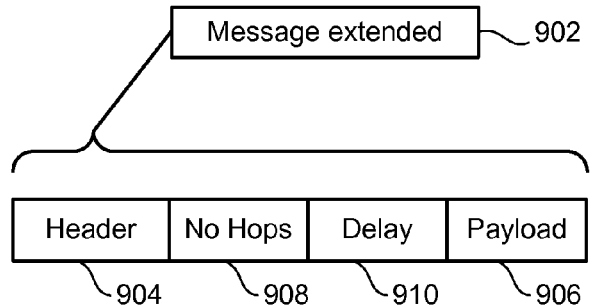
FIG. 9 illustrates a message used to transmit events in the system of FIG. 1.

FIG. 9 illustrates an example message and associated message format which may be utilized in the systems of FIG. 1 and FIGS. 7/8. Specifically, as shown, a message 902 may include a header 904 which may represent a standard or conventional message header. Similarly, a payload 906 may represent an otherwise standard or conventional payload (e.g., may include one or more events and associated information).

Further in FIG. 9, a field 908 may be included in conjunction with the header 904, which, as described, includes a total, accumulated number of hops experienced by the message in traversing a relevant network, e.g., the nodes 102A-102E of FIG. 1, or the nodes 702-726 of FIGS. 7/8. Similarly, a field 910 may include a total or accumulated delay experienced by the message in traversing a relevant network. As described herein, the delay included within the field 910 may include accumulated average latencies between each pair of nodes traversed by the message in question, where the previously-accumulated average transmission time between the relevant pair of nodes represents a proxy for an actual transmission time of the message in question between the two nodes.

Figure 10:
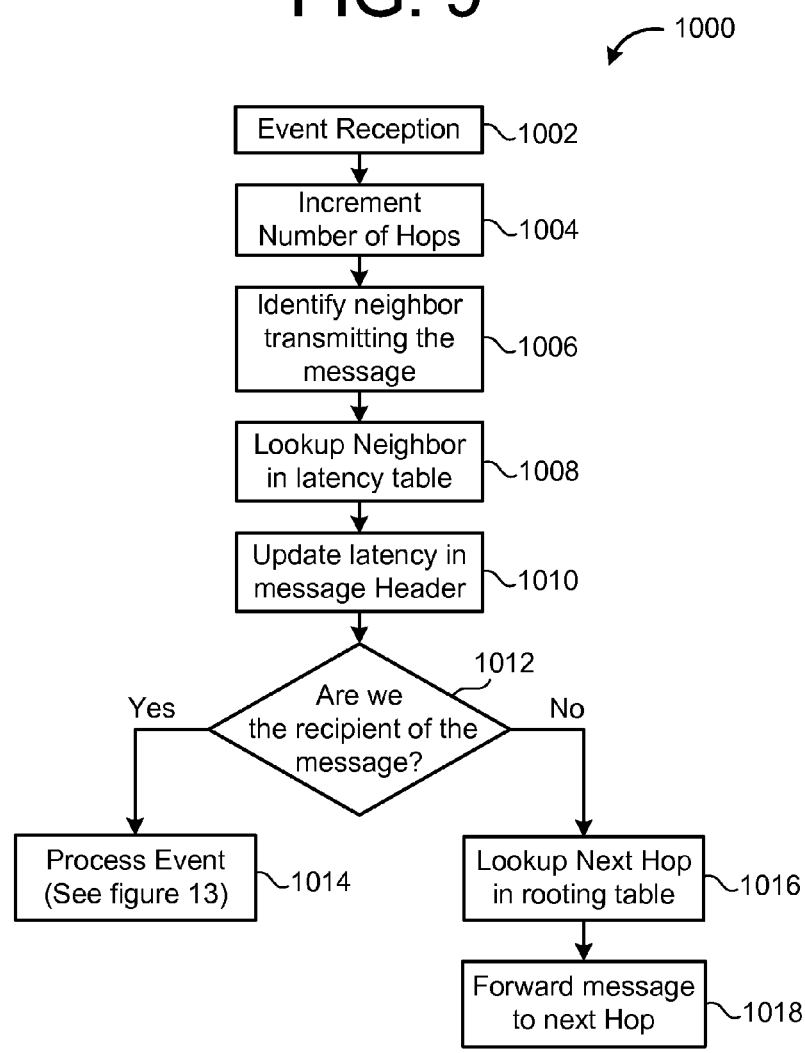
FIG. 10 is a flowchart illustrating example operations for updating a header of the message of FIG. 9.
Figure 11A:
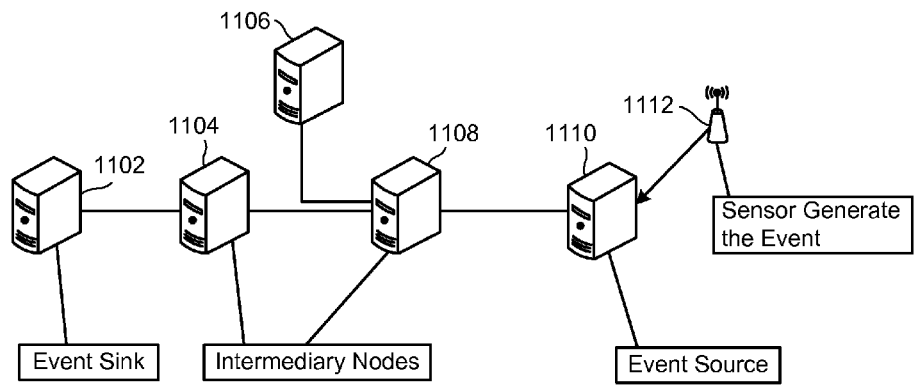
FIGS. 11A-11B are architectural diagrams illustrating the first two stages for transporting the message of FIG. 9.
Figure 11B:
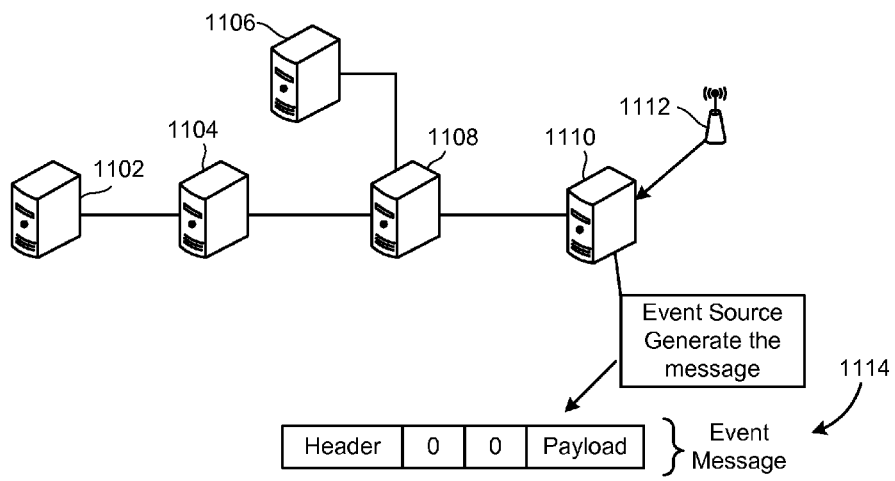

FIG. 10 is a flowchart 1000 illustrating example operations associated with updating a message header of the message of FIG. 9. That is, it may be appreciated from the above description that the flowchart 1000 represents actions of the node 102B, i.e., of the transmission time calculator 110 and the message handler 112 (and associated header manager 114).

In the example of FIG. 10, an event message may be received (1002), e.g., at the node 102B, or at one of the nodes 706-726. Upon receipt, the header manager 114 may increment the number of hops field 908 of the message 902 (1004). Subsequently, the receiving node may identify the neighbor node which transmitted the message in question (1006). For example, if the receiving node is represented by the node 102B of FIG. 1, then the message handler 112 may identify the node 102A of the neighbor node which transmitted the message in question. Similarly, with respect to FIGS. 7/8, if the receiving node represents, e.g., the node 714, then the node 714 may identify the preceding node 706 as the transmitting source of the message in question.

Consequently, the receiving node may proceed to identify or look up the identified neighbor node within a latency table which specifies an average transmission time between the identified pair of nodes (1008). The header manager 114 may thereafter update the latency information, including updating the delay accumulated within the field 910 (1010).

If the node in question is the ultimate recipient of the message (1012), e.g., is the node 102C of FIG. 1 or the node 726 of FIGS. 7/8, then the node may proceed with processing the relevant event (1014), as described in more detail below, e.g., with respect to FIG. 13. On the other hand, if the node is not the ultimate recipient of the message (1012), then the node may proceed by looking up a next hop in the relevant network path for the message, using a conventional routing table (1016). Subsequently, the node may proceed to forward the message in question to the best-identified next hop (1018).

FIGS. 11A-13 illustrates an example of the operations of the flowchart 1000 of FIG. 10, using the message structure of FIG. 9. Specifically, in the examples, nodes 1102-1110 are illustrated, along with a sensor 1112 generating the event in question. Thus, as shown, the node 1110 may operate as the event source which receives the event generated by the sensor 1112 and encapsulates the event within a message 1114, as illustrated in the example of FIG. 11B, for transmission along a network path including nodes 1108, 1104 as intermediate nodes used to transmit the message to the event sink node 1102. As shown in FIG. 11B, the message 1114 may utilize the structure of FIG. 9, and may include initially no values for the corresponding count and delay fields 908, 910 (i.e., as shown, the corresponding fields may initially be set to zero by the node 1110).

Figure 12A:
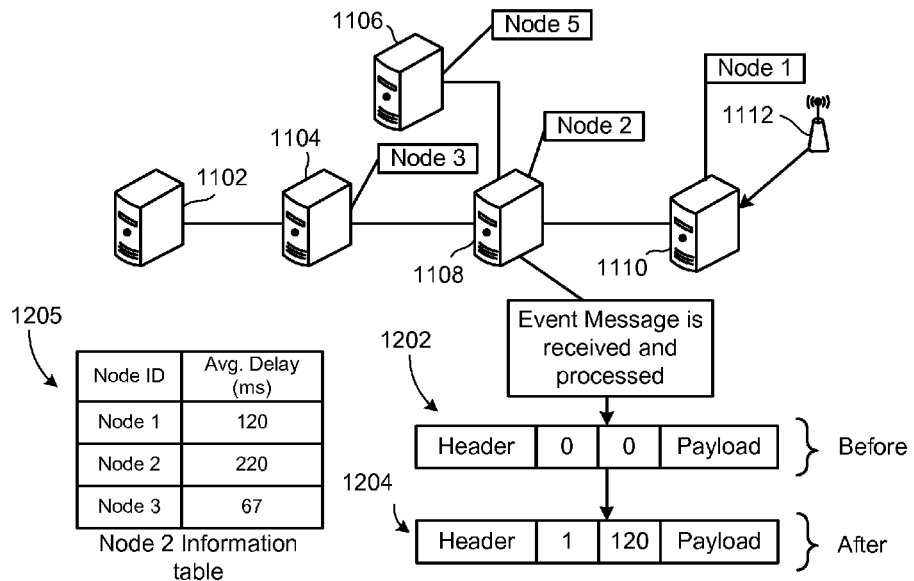
FIGS. 12A-12B are architectural diagrams illustrating further stages of transmission of the message of FIG. 9.

In the example of FIG. 12A, the node 1108 is illustrating as processing and routing the message in question. Specifically, as shown, the node 1108 may modify the received message 1202 to obtain an updated message 1204. A transmission time table 1205 may be maintained by the transmission time calculator 110 of the node 1108, which, as described, maintains average delays between the node 1108 and neighboring nodes 1110, 1106, 1104

From the transmission time table 1206, it may be observed that the average transmission time between the node 1110 and the node 1108 is recorded as 120 milliseconds. Consequently, the update message 1204 includes a count field which has been incremented to one to reflect transmission of the message from the node 1110 to the node 1108, as well as a delay field which is updated to include the value 120 milliseconds representing the transmission delay experienced by the message during its transmission from the node 1110 to the node 1108.

Figure 12B:
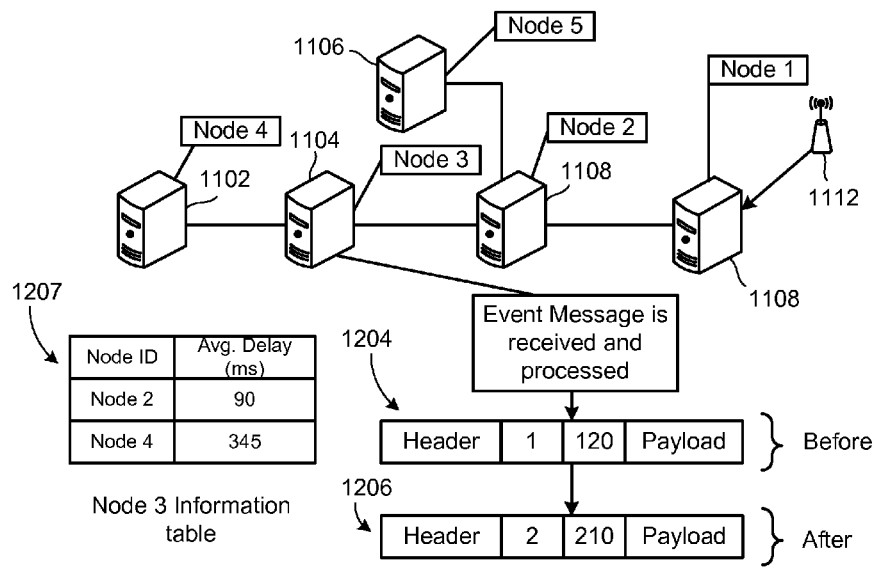

FIG. 12B illustrates similar processing on the part of the intermediate node 1104. That is, as shown, the node 1104 may maintain a table 1207, so that the previously updated message 1204 may again be updated to obtain a message 1206. As shown, the message 1206 includes an incremented number of hops with a value of 2, as well as an aggregation of delays, i.e., updating the delay field from 120 milliseconds to 210 milliseconds.

Figure 13:
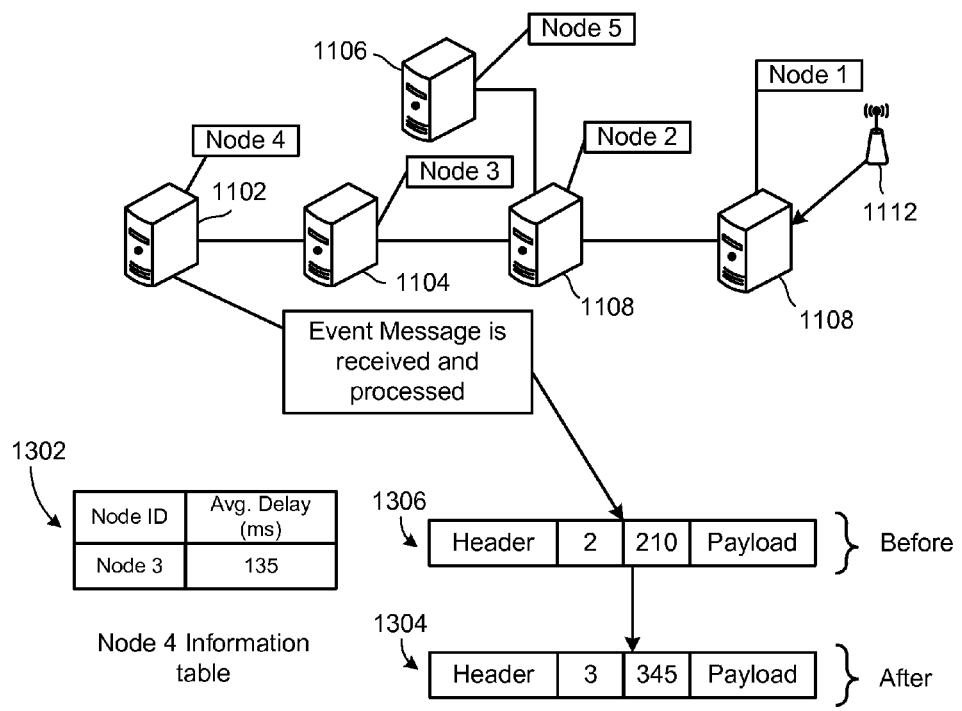
FIG. 13 is an architectural diagram illustrating a receipt of the message of FIG. 9 at a final destination.

FIG. 13 illustrates a final iteration of the processes of the flowchart 1000 as illustrated and explained above with respect to FIGS. 11A/11B and 12A/12B. Specifically, as shown, in FIG. 13, the event sink node 1102 receives the message 1206, and utilizes its own table 1302 to obtain a final, updated version of the message, illustrated as message 1304. As shown, and as described above with respect to FIGS. 11A-12B, the final message 1304 may include an incremented number of hops (i.e., 3), as well as an aggregated amount of transmission delay (i.e., 345 milliseconds).

Figure 14:
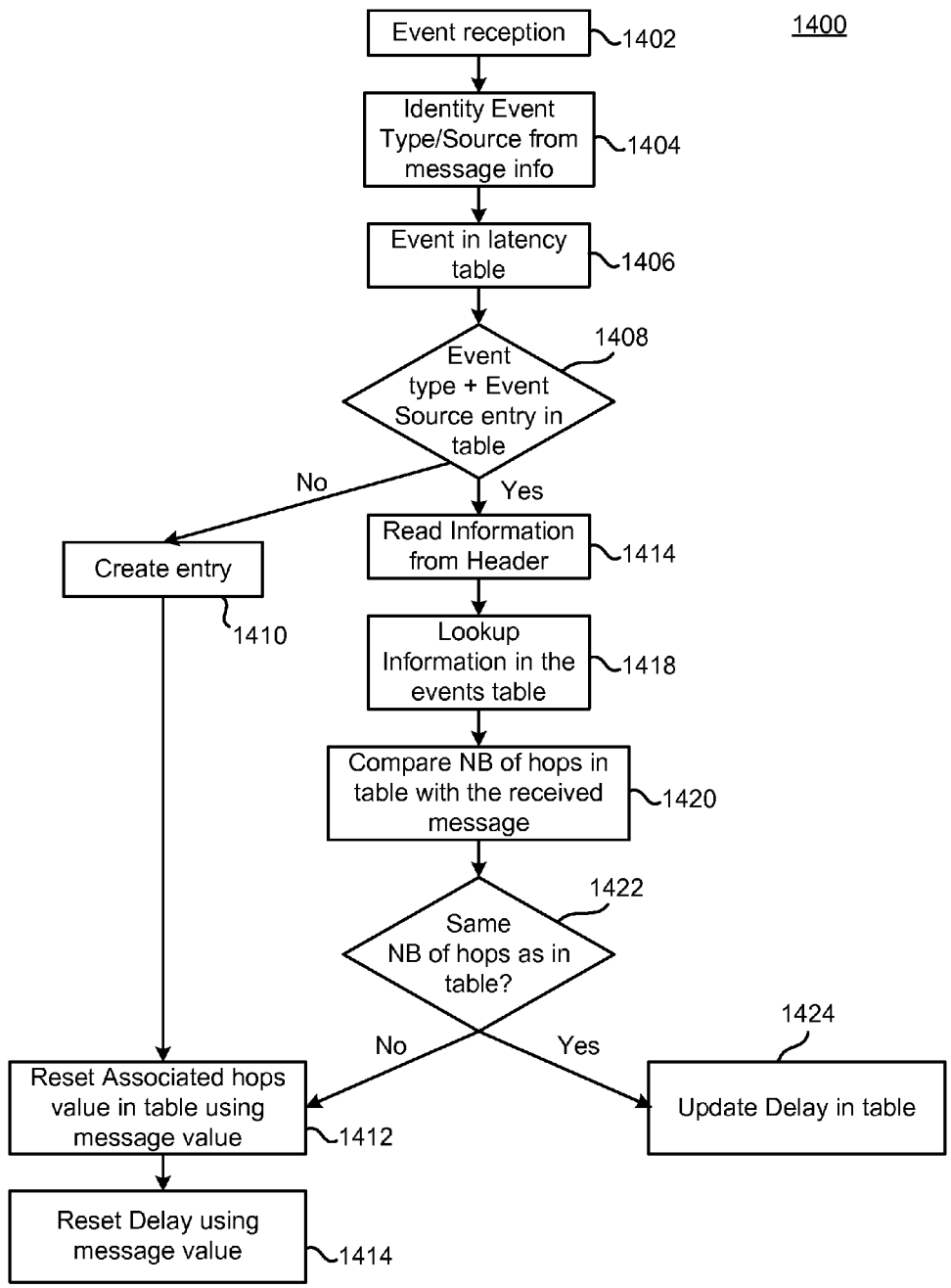
FIG. 14 is a flowchart illustrating example operations for updating an event information table in conjunction with transmissions of the message of FIG. 9 as illustrated in the examples of FIGS. 11A-13.

FIG. 14 is a flowchart 1400 illustrating operations of a sink node operating as a message recipient to perform associated complex event processing, e.g., the sink node 102C of FIG. 1, or the sink node 1102 of FIGS. 11A-13. More specifically, FIG. 14 illustrates operations of the table manager 118 in maintaining a latency table which includes (as compared to the transmission time tables 1205, 1207, 1302, above) latency information for various messages traversing various network paths to the sink node. An example of such a table maintained by the table manager 118 is provided below as table 1.

TABLE 1

Table Maintaining events Information

| Event Type | Event Source | Nb Hops | Avg Latency (ms) | Last 5 latency recorded | | | | |
|---|---|---|---|---|---|---|---|---|
| A | node1 | 5 | 225 | 227 | 236 | 180 | 234 | 210 |
| B | node2 | 3 | 452 | 424 | 456 | 480 | 464 | 410 |
| B | node1 | 4 | 347 | 327 | 336 | 380 | 334 | 310 |
| C | node3 | 2 | 75 | 87 | 36 | 80 | 74 | 97 |

In the example of FIG. 14, then, operations may begin with reception of an event message at the relevant sink node (1402). The message handler 106 including the table manager 118, may proceed to identify a type and source of the received event from the received message (1404). The table manager 118 may then store the received event within an associated latency table, e.g., the table 1 (1406). If a table entry for the event type/source does not yet exist (1408), then a corresponding table entry may be created within the table (1410).

Subsequently, a value for the number of hops reflected within the header of the message may be updated accordingly (1412), and a corresponding latency/delay field may be populated based on the corresponding field within the message header (1414). Of course, in examples in which a new table entry is created, the associated most-recent latencies that would typically be stored in conjunction therewith and used to calculate a moving average for the latency may not be currently populated, but may become populated in subsequent iterations.

Specifically, when such table entries for a specific event type/source already exist (1408), then latency information may be read from the message header (1416), including, e.g., the accumulated transmission delay and accumulated number of hops. A table manager may then look up related information from the table (e.g., a current number of hops).

Then, the table manager may compare the current number of hops in the table with the number of hops within the received message (1420). If the number of hops include within the message is the same as the number of hops in the table, then the table manager may simply proceed to update the delay information within the table (1424) including using the received delay within the illustrated fields for recording the most recent five recorded latencies.

However, if the number of hops is different (1422), then again the table manager may reset the associated hops value in the table using the new hops value (1412), and proceed to reset the delay information (e.g., including erasing the current values for the most recent five latencies recorded, on the assumption these are now obsolete given the presence of the different number of hops, which may be understood to reflect a new or modified path through the network).

Thus, table 1 and the example of FIG. 14 illustrate that each potential recipient node may maintain a table such as the table 1, which includes events of various types corresponded with sources of such events. As shown and described, each combination of event type and event source may be stored in conjunction with a current number of hops associated with the network path from the specified event source to the recipient node itself. As described, this number of hops may change over time, as the corresponding network path from the event source to the recipient node changes. However, as long as the number of hops is valid, then the average latency field may reflect a moving average of most recent latencies received, e.g., of the five most recent latency values, as shown.

In this way, as described, the recipient nodes may maintain a current, updated baseline of latency information and associated transmission durations of messages received over the network. Further, the table manager 118 may provide the window manager 108 with a basis for adjusting temporal relationships between received events and associated processing intervals, including using a comparison of the information from the table of the table manager 118 in conjunction with corresponding latency information as extracted from a header of a current message, as provided by the header inspector 116. Further, the event processor 104 may be enabled to proceed with accurate complex event processing, even in the presence of the various types of network delays described herein, and without requiring a global or universal timing scheme for the network as a whole.

With reference to the above, the window manager 108 may utilize one or more of a number of techniques for enabling the event processor 104 to proceed with accurate complex event processing. For example, the delay adjuster 124 may utilize the queue 126 to mitigate event state inconsistency between various event sources from the point of view of the recipient or a sink node. That is, the queue 126 may be understood to enable the delay adjuster 124 to create a uniform perceived delay associated with the transport of the different events, thereby creating an artificial delay state consistency.

Using this method, all the messages will have the same perceived latency at the event processor 104, thereby simplifying the maintenance of the associated time window (e.g., the processing interval), because the messages will all have to follow the same dynamic adaptation across all the events processed. In order to create such artificial consistency, all the messages arriving at the event processing/recipient/sink node may be delayed by an amount of time T, where T is calculated according to equation 1:

$$T - T_{Worstavglatency} - T_{message}$$ Equation 1 here $T_{Worstavglatency}$ is the worst average latency measured up to that time, and $T_{message}$ is the relevant message/event latency. More specifically, and in more detail, FIG. 15 illustrates a flowchart 1500 illustrating operations 1502-1514 for providing the type of uniform perceived delay just described.

Figure 15:
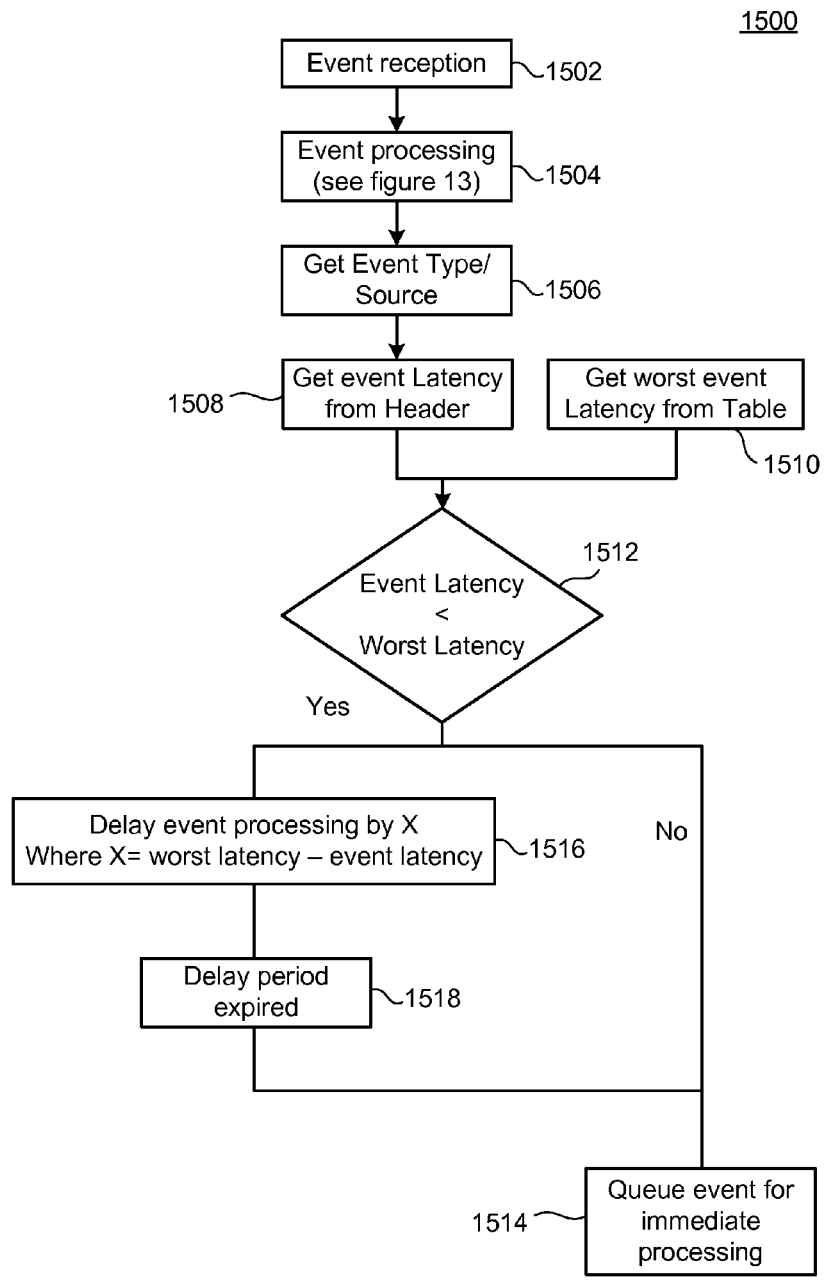
FIG. 15 is a flowchart illustrating example operations for delaying event processing to reflect network transmission delays.

In the example of FIG. 15, event reception (1502) occurs at the processing/recipient/sink node. The subsequent event processing described above with respect to FIG. 13 may then proceed (1504). Subsequently, the window manager 108, e.g., the delay adjuster 124 may retrieve the relevant type of the event and source of the event (1506), using the type of table illustrated above with respect to the table 1.

Subsequently, the delay adjuster 124 may retrieve the relevant delay/latency information as extracted from the header of the message header inspector 116 (1508), and may also retrieve the worst (i.e., largest) event duration/latency from the table (1510), e.g., the largest of the five most recent values recorded within the table for the corresponding event type/source.

If the event latency is greater than the worst latency (1512), then the delay adjuster 124 may simply queue the event within the queue 126 for immediate processing (1514). However, if the event latency is less than the worst latency (1512), then the delay adjuster 124 may delay the event processing by a value X, where the value X equals the worst event latency minus the event latency (1516). Once the best-calculated period for event processing delay has expired (1518), then the delay adjuster 124 may return the event in question to the queue for subsequent immediate processing (1514).

Figure 16:
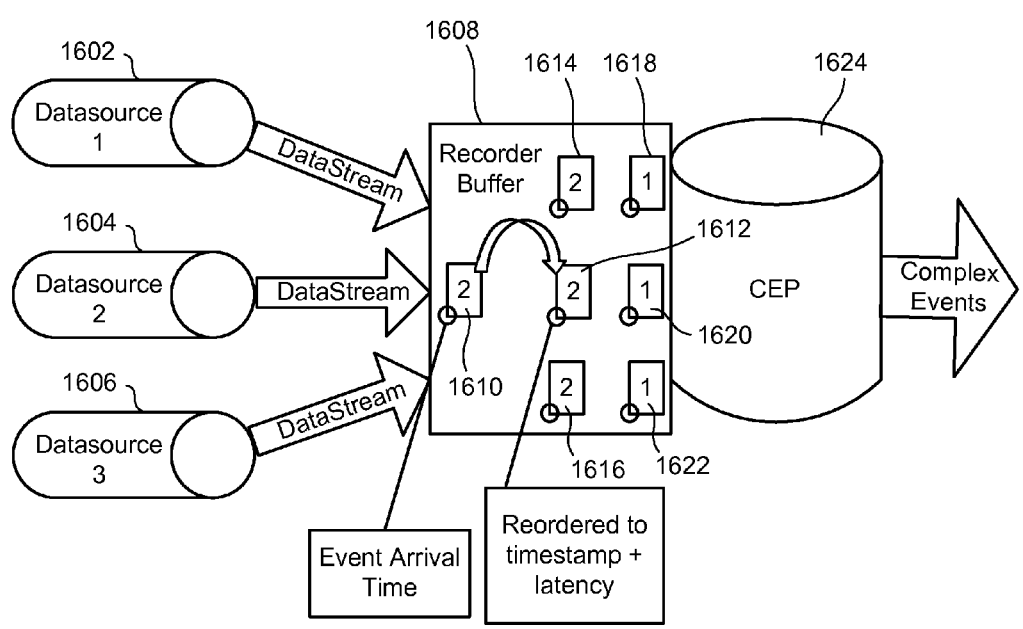
FIG. 16 is a block diagram illustrating a reordering of received events within a buffer to reflect network transmission delays.

FIG. 16 is a block diagram illustrating event reordering according to the techniques of the flowchart 1500 of FIG. 15. Specifically, as shown, in the example of FIG. 16, a plurality of data sources and associated data streams 1602, 1604, 1606 are illustrated as transmitting events to a reorder buffer representing some or all of the queue 126. As referenced above, the reorder buffer 1608 may be configured to gather information and reorder event messages based on their arrival time in conjunction with associated latency information.

In the example, an event 1610 from the data source/data stream 1604 provides at a time which is determined to be delayed, based on the associated processing of latency information contained within the header of the corresponding message. Meanwhile, appreciating events 1618, 1620, 1622, which may not have experienced any additional delay in the simplified example of FIG. 16, may be received at an event processor 1624, to thereby provide higher level complex events, as shown.

Further in the example, events 1614, 1616 as received respectively from the data sources/data streams 1602, 1606 are illustrated as having been received within a relevant time window and without having experienced associated transmission delay. Nonetheless, because, in the example, the event 1610 does not arrive in a timely fashion, it may be understood from the above examples, e.g., the example of FIGS. 6A and 6B, that the events 1614, 1616 may result in a false negative if processed by themselves and without recognition of the proper inclusion (or lack thereof) of the event 1610. Nonetheless, according to the operations described above with respect to FIG. 15, it may be appreciated that the event 116 may be reorder using associated latency information from the relevant message and from the table provided by the table manager 118, as described above.

Thus, the FIG. 16 illustrates that although the event 1610 is delayed, the event 1610 may nonetheless be reordered to appear within a correct time window. Additionally, or alternatively, a size of the reorder buffer 1608 and/or the delay imparted prior to passing the event for complex event processing 1624 against a plurality of queries and/or associated query streams, may be controlled utilizing the information gathered from the routing layer.

Figure 17:
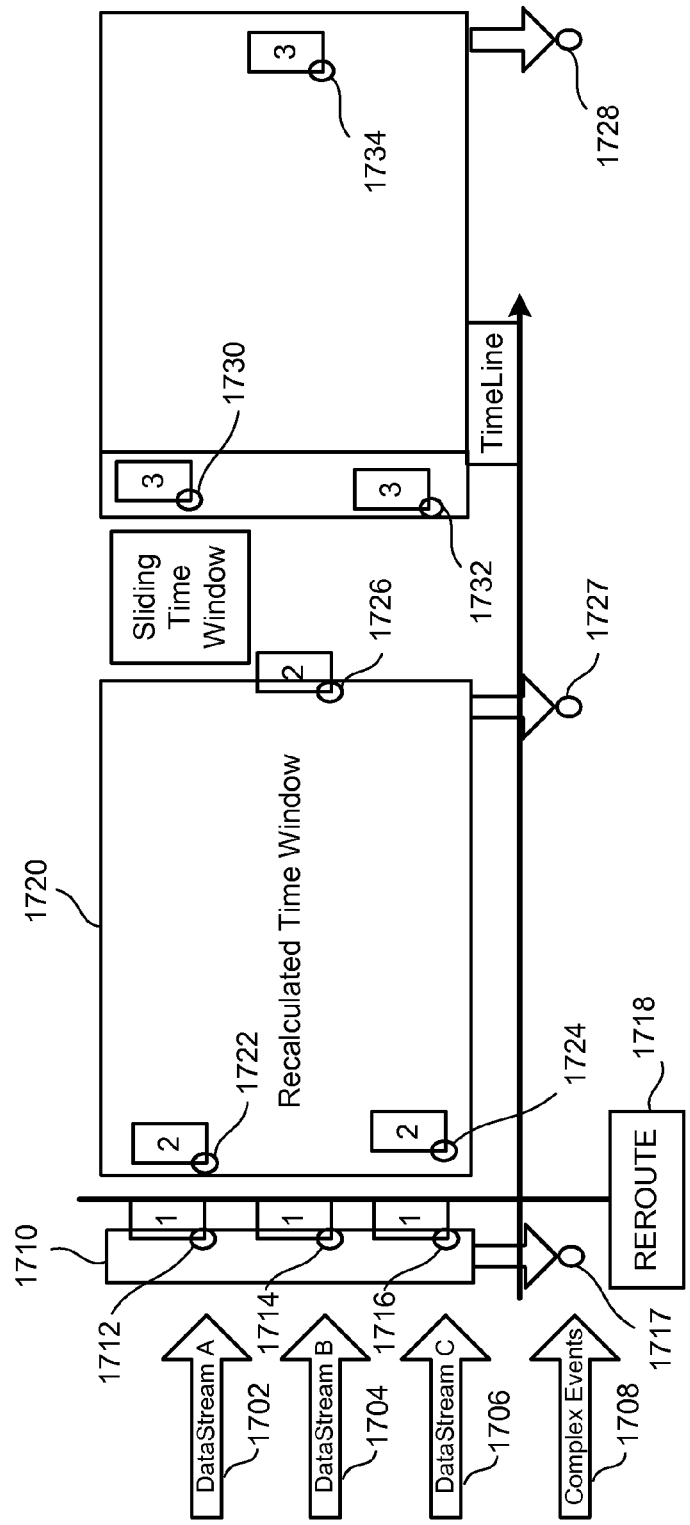
FIG. 17 is a timing diagram illustrating dynamic adaptation of a window to reflect network transmission delays.

FIG. 17 is a timing diagram illustrating an example in which events from data streams 1702, 1704, 1706 may be received for processing to provide higher level complex events 1708. Thus, it may be appreciated that FIG. 17 (as well as FIG. 18, below) is generally structured as illustrated similarly to the example of FIG. 6, above. Consequently, as shown, a time window 1710 may be defined so that events 1712, 1714, 1716 received respectively from the data streams 1702, 1704, 1706, may be processed to provide a resulting higher level complex event 1717.

FIG. 17 further illustrates that subsequent events 1722, 1724, 1726 received from the data streams 1702-1706, as shown, may be processed within an enlarged, calculated time window 1720 to thereby provide resulting complex event 1727. In other words, it may be appreciated from the above description that the event 1726 may be associated with experiencing a network delay, which therefore causes the event 1726 to be received at an event processing node at a time much later than would otherwise have occurred.

Normally, as described above with respect to FIG. 6, such a result would cause the output of a false negative, since a normal time window would have detected only the events 1722, 1724, and therefore would not have output corresponding complex events. However, in the example of FIG. 17, the size manager 122 of the window manager 108 may be configured to recalculate and adjust a default or defined value for the associated time window, to thereby obtain the recalculated time window 1720.

In this way, the internet processor may be provided with all of the events 1722-1726, and may therefore accurately provide the resulting complex event 1727. FIG. 17 also illustrates a second, similar example, in which events 1730, 1732 are received on time, but event 1734 continues to experience the delays experienced by the event 1726, and/or other delays.

Consequently, as with the recalculated time window 1720, the size manager 122 may recalculate an otherwise normal size of the time window that would be associated with received events from the data streams 1702-1706, to thereby obtain the recalculated, extended time window 1728. Thus, again, as just described with respect to the recalculated time window 1720, the event processor 104 may proceed with otherwise conventional event processing to thereby obtain and provide the complex event 1729.

Figure 18:
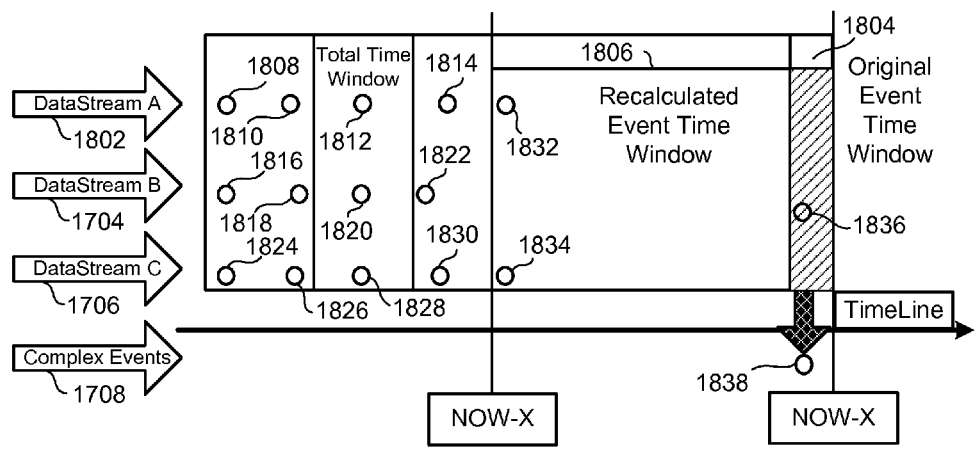
FIG. 18 is a second timing diagram illustrating dynamic window adaptation to reflect network transmission delays.

FIG. 18 illustrates a similar example, in which the size manger 122 may be configured to recalculate a size of a relevant window in order to capture a desired event that would have otherwise have been missed. More specifically, as shown, a total time window 1802 may be utilized to proceed with processing of events 1812, 1820, 1828 received respectively from the data streams 1702-1706. Similar comments apply to various other ones of the illustrated events 1808, 1810, 1814-1818, 1822-1826, and 1830. Further, at a later time, an original event window 1804 may be recalculated to obtain the recalculated event time window 1806. As shown, the calculated event time window may be extended so as to capture all events 1832-1834 which should be processed to provide a resulting complex event 1838.

With reference to FIGS. 17 and 18, and as referenced above, the window manager 108 may monitor the table such as the table 1 which contains average latencies of all data streams which might be relevant to a query received from the user. Then, any significant, non-trivial change in the average latency for a particular event source or event type may trigger a number of operations in order to obtain the illustrated results of FIGS. 17 and 18.

Specifically, in a first instance, it may be necessary or desirable to identify all events and questions which may require, or be associated with, an overall window adjustment. In some embodiments, each event may be composed of information from multiple sources, so for each event it may be necessary or helpful to identify all data streams and their associated latencies. Then, the size manager 132 may reset the size of the window 1804 to a recalculated window size 1806 as illustrated.

Each event may be composed of information from multiple sources, so for each event it may be necessary or helpful to identify all data streams and their latencies. Then, a relevant window size of the recalculated window 1720, 1806 may not be set by a single latency, but by considering all of the event data streams, as obtained from table 1.

Then, the basis for calculation for the recalculated window size may be based on a highest latency experienced by a data stream for the event, minus a minimal latency experienced by a data stream for the event, plus a percentage to allow for a regular transmission latency. Consequently, not only may the window size be recalculated if the data stream affected by the change in the latency is either the highest or the lowest latency out of all the data streams for the event. The larger the percentage for latency, the higher the chance that false positives and false negatives will result. Nonetheless, selecting two small a value may cause too-frequent recalculation of the window in question.

As an example of the above, it may be appreciated that table 1 can be extended to include threshold values above/below which a recalculation would be triggered. The threshold would be set during the recalculation process and would be utilized to account for latency caused by non-routing latencies used, such as, e.g., machine loading or network traffic rather than a latency caused by re-routing. The threshold may be calculated as a defined percentage ("X") percent of the window size and would be set during recalculation.

For example, the value X may be based on a percentage used to allow for drifts and irregularities in the window size. In such cases, the table 1 must be updated with the new thresholds for each effective row. Having calculated the window size, the old query is replaced with a new query having the new values for each affected event. Because the named window is divorced from the query, it is available to multiple queries, and values from the toll time window are still available to the new query. Then, it may be appreciated that querying over part of the entire window may be implemented by counting back from a query time over the set time X, as illustrated above with respect to FIG. 18.

Many queries may be utilized and may use a window within a query to retain the state information associated with the event. This means that if a new query is started, the information previously stored will be lost, thereby making it difficult or undesirable to change a window size, even in a means of obtaining desired window size adjustments as described herein. The example of FIG. 18 uses a named window that is available to multiple queries, e.g., the window 1802. FIG. 18 illustrates that it is possible to query over a portion of the window 1802, and to start a new query based on associated, or revised latency, without losing the original buffer of information.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system including instructions recorded on a computer-readable medium and executable by at least one processor, the system comprising:
    a message handler configured to cause the at least one processor to receive a plurality of messages associated with a plurality of events, the events having a temporal relationship to one another, the events including a first event and a second event, wherein the first event and the second event are associated with a time window to process the first event and the second event such that the first and second events are not processed when at least one of the first and second events are considered to have occurred outside the time window;
    a header inspector configured to cause the at least one processor to extract latency information from the plurality of messages, the latency information characterizing a transmission duration experienced by each message in traveling from one or more source nodes through a network of nodes;
    a window manager configured to cause the at least one processor to correct a disruption in the temporal relationship between the first event and the second event based on the extracted latency information for a first message corresponding to the first event and a second message corresponding to the second event, the disruption including relative differences in the transmission duration experienced by the first event and the second event, wherein disruption in the temporal relationship is corrected by extending the time window such that the first event and the second event fall within the time window; and
    an event processor configured to cause the at least one processor to process the first and second events relative to the time window.

2. The system of claim 1, wherein the latency information extracted from each message includes an aggregation of average transmission times between each pair of nodes traversed by the message through the network of nodes, the average transmission times having been added incrementally to the aggregation at each traversed node.

3. The system of claim 1, wherein the latency information extracted from each message includes an aggregation of a total number of hops experienced by a respective message through the network of nodes, each hop of the total number of hops having been added incrementally at each traversed node.

4. The system of claim 1, comprising:
    a transmission time calculator configured to maintain a transmission time table which characterizes average transmission times between a node hosting the system and other network nodes connected by a single hop.

5. The system of claim 1, comprising:
    a header manager configured to update, within a header of each message received at the node hosting the system from a transmitting node one hop away therefrom, the latency information including the average transmission time between the hosting node and the transmitting node.

6. The system of claim 1, wherein the network of nodes includes a peer-to-peer network.

7. The system of claim 1, wherein the window manager is configured to detect the disruption including comparing the latency information of each message with expected latency information for the corresponding message.

8. The system of claim 7, comprising a table manager configured to maintain the expected latency information including a latency table characterizing recent latency information determined with respect to previous messages traversing the network of nodes from the corresponding source node.

9. The system of claim 1, wherein the window manager comprises a view generator configured to display at least one of the latency information and the relation of the first and second events to the time window.

10. The system of claim 1, wherein the window manager comprises a delay adjuster configured to correct the disruption including delaying processing of at least one of the first and second events within a queue, in order to relate the first and second events relative to the time window in an order corresponding to an actual order of occurrence thereof.

11. The system of claim 1, wherein the window manager comprises a size manager configured to correct the disruption including adjusting a relative size of the time window in order to relate the first and second events within the adjusted time window in a manner corresponding to an actual occurrence thereof within the time window.

12. A computer-implemented method for executing instructions stored on a computer readable storage medium, the method comprising:
    receiving a plurality of messages associated with a plurality of events, the events having a temporal relationship to one another, the events including a first event and a second event, wherein the first event and the second event are associated with a time window to process the first event and the second event such that the first and second events are not processed when at least one of the first and second events are considered to have occurred outside the time window;
    extracting latency information from the plurality of messages, the latency information characterizing a transmission duration experienced by each message in traveling from one or more source nodes through a network of nodes;
    correcting a disruption in the temporal relationship between the first event and the second event based on the extracted latency information for a first message corresponding to the first event and a second message corresponding to the second event, the disruption including relative differences in the transmission duration experienced by the first event and the second event, wherein disruption in the temporal relationship is corrected by extending the time window such that the first event and the second event fall within the time window; and
    processing the first and second events relative to the time window.

13. The method of claim 12, wherein the correcting the disruption includes detecting the disruption including comparing the latency information of each message with expected latency information for the corresponding message.

14. A computer program product, the computer program product being tangibly embodied on a non-transitory computer-readable storage medium and comprising instructions that, when executed, are configured to:
   receive a plurality of messages associated with a plurality of events, the events having a temporal relationship to one another, the events including a first event and a second event, wherein the first event and the second event are associated with a time window to process the first event and the second event such that the first and second events are not processed when at least one of the first and second events are considered to have occurred outside the time window;
   extract latency information from the plurality of messages, the latency information characterizing a transmission duration experienced by each message in traveling from the one or more source nodes through a network of nodes;
   correct a disruption in the temporal relationship between the first event and the second event based on the extracted latency information for a first message corresponding to the first event and a second message corresponding to the second event, the disruption including relative differences in the transmission duration experienced by the first event and the second event, wherein disruption in the temporal relationship is corrected by extending the time window such that the first event and the second event fall within the time window; and
   process the first and second events relative to the time window.

15. The computer program product of claim 14, wherein the latency information includes aggregated latency information having been added incrementally at each node traversed by each message through the network of nodes.

16. The computer program product of claim 14, wherein the disruption is corrected including comparing the latency information of each message with expected latency information for the corresponding message.

17. The computer program product of claim 14, wherein the instructions, when executed, are configured to correct the disruption including delaying processing of at least one of the first and second events within a queue, in order to relate the first event and the second event relative to the time window in an order corresponding to an actual order of occurrence thereof.

18. The computer program product of claim 14, wherein the instructions, when executed, are configured to extend the time window include instructions to adjust a size of the time window in order to relate the first and second events within the adjusted time window in a manner corresponding to an actual occurrence thereof within the time window.

* * * * *